United States Patent
Suzuki et al.

(10) Patent No.: US 8,619,980 B2
(45) Date of Patent: Dec. 31, 2013

(54) INFORMATION GENERATION APPARATUS, METHOD, PROGRAM, AND RECORDING MEDIUM FOR DERIVING A DECRYPTION KEY FROM ANOTHER DECRYPTION KEY

(75) Inventors: Koutarou Suzuki, Tokyo (JP); Ryo Nishimaki, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 28 days.

(21) Appl. No.: 13/258,165

(22) PCT Filed: Apr. 23, 2010

(86) PCT No.: PCT/JP2010/057279
§ 371 (c)(1),
(2), (4) Date: Oct. 14, 2011

(87) PCT Pub. No.: WO2010/123116
PCT Pub. Date: Oct. 28, 2010

(65) Prior Publication Data
US 2012/0027206 A1 Feb. 2, 2012

(30) Foreign Application Priority Data
Apr. 24, 2009 (JP) ................. 2009-106009

(51) Int. Cl.
*H04L 9/00* (2006.01)
*H04K 1/00* (2006.01)
*H04L 9/28* (2006.01)
*H04L 29/06* (2006.01)
*H04L 9/32* (2006.01)

(52) U.S. Cl.
USPC ............ 380/44; 380/255; 380/262; 380/268; 380/28; 713/150; 713/168

(58) Field of Classification Search
USPC .............. 380/44, 255, 262, 268, 28; 713/150, 713/168
See application file for complete search history.

(56) References Cited

U.S. PATENT DOCUMENTS

| | | | |
|---|---|---|---|
| 2003/0179885 A1 | 9/2003 | Gentry et al. | |
| 2004/0086117 A1* | 5/2004 | Petersen et al. ................. | 380/44 |
| 2007/0050629 A1 | 3/2007 | Gentry et al. | |
| 2008/0013722 A1 | 1/2008 | Gentry et al. | |
| 2010/0020977 A1 | 1/2010 | Furukawa | |

FOREIGN PATENT DOCUMENTS

| | | |
|---|---|---|
| JP | 2005 521323 | 7/2005 |
| WO | 2008 099831 | 8/2008 |

OTHER PUBLICATIONS

Extended European Search Report issued Jul. 18, 2012 in European Patent Application No. 10767171.1.
Tatsuaki Okamoto, et al., "Homomorphic Encryption and Signatures from Vector Decomposition", Pairing-Based Cryptography A Pairing, XP 19103359A, Sep. 1, 2008, pp. 57-74.

(Continued)

*Primary Examiner* — Aravind Moorthy
(74) *Attorney, Agent, or Firm* — Oblon, Spivak, McClelland, Maier & Neustadt, L.L.P.

(57) ABSTRACT

Hierarchical cryptography expressed in a general semiordered structure other than a tree structure is implemented. In information generation, random numbers $\sigma_v$ and $(\sigma_{vj})_{j \in w(v)} \in Z_q$ are generated; main information $k_v = \sigma_v \Sigma_{i \in \{1,\ldots,N-1\} \setminus w(v)} v_i b_i^* + b_N^*$ is calculated; and derivation information $k_{vj} = \sigma_{vj} \Sigma_{i \in \{1,\ldots,N-1\} \setminus w(v)} v_i b_i^* + b_j^*$ is calculated for each $j \in w(v)$. In information derivation, random numbers $\sigma_u$ and $(\sigma_{uj})_{j \in w(u)} \in Z_q$ are generated; main information $k_u = \sigma_u \Sigma_{i \in w(v) \setminus w(u)} u_i k_{vi} + k_v$ is calculated; and derivation information $k_{uj} = \sigma_{uj} \Sigma_{i \in w(v) \setminus w(u)} u_i k_{vi} + k_{vj}$ is calculated for each $j \in w(v)$.

13 Claims, 4 Drawing Sheets

(56) References Cited

OTHER PUBLICATIONS

Elaine Shi, et al., "Delegating Capabilities in Predicate Encryption Systems", Automata, Languages and Programming (Book Series: Lecture Notes in Computer Science), XP 19092661A, Jul. 7, 2008, pp. 560-578.

Dan Boneh, et al., "Hierarchical Identity Based Encryption with Constant Size Ciphertext", Lecture Notes in Computer Science/ Computational Science, vol. 3494, XP 8116660A, Jun. 20, 2005, pp. 440-456.

Boyen, X., et al., "Anonymous Hierarchical Identity-Based Encryption (Without Random Oracles)," Cryptology ePrint Archive, Total 31 Pages, (Jun. 8, 2006).

Katz, J., et al., "Predicate Encryption Supporting Disjunctions, Polynomial Equations, and Inner Products," Cryptology ePrint Archive, Total 30 Pages (Jul. 8, 2008).

Shi, E., et al., "Delegating Capabilities in Predicate Encryption Systems," Cryptology ePrint Archive, Total 36 Pages, (Jun. 24, 2008).

Okamoto, T., et al., "Hierarchical Predicate Encryption for Inner-Products," Lecture Notes in Computer Science, vol. 5912, pp. 214-231, (Dec. 1, 2009).

Gentry, C., et al., "Hierarchical ID-Based Cryptography," ASIACRYPT 2002, LNCS 2501, pp. 548-566, (2002).

"ISO/IEC 18033-2: Information technology-Security techniques-Encryption algorithms-Part 2: Asymmetric ciphers," International Standard, ISO/IEC 18033-2:2006(E), pp. 10-11, (May 1, 2006).

Boyen, X., et al., "RFC 5091: Identity Based Cryptography Standard (IBCS) #1: Supersingular Curve Implementations of the BF and BB1 Cryptosystems," pp. 1-63, (Dec. 2007).

Blake, I. F., et al., "Elliptic Curves in Cryptography," pp. 31-37, (Dec. 20, 2001) (with its corresponding pages from the original work, London Mathematical Society Lecture Note series 265, The press syndicate of the University Cambridge, pp. 29-35) (with partial English translation).

Menezes, A., "Elliptic Curve Public Key Cryptosystems," The Kluwer International Series in Engineering and Computer Science: Communications and Information Theory, pp. 61-81, (1993).

Miller, V. S., "Short Programs for functions on Curves," Exploratory Computer Science, pp. 1-7, (May 6, 1986).

Miyaji, A., et al., "New explicit conditions of elliptic curve traces for FR-reduction," IEICE Trans. Fundamentals, vol. E84-A, No. 5, pp. 1-10, (May 2001).

Barreto, P. S. L. M., et al., "Constructing Elliptic Curves with Prescribed Embedding Degrees," SCN 2002, LNCS 2576, pp. 257-267, (2003).

Dupont, R., et al., "Building curves with arbitrary small MOV degree over finite prime fields," pp. 1-13, (Jul. 18, 2002).

Katz, J., et al., "Predicate Encryption Supporting Disjunctions, Polynomial Equations, and Inner Products," EUROCRYPT 2008, LNCS 4965, pp. 146-162, (2008).

International Search Report Issued Jun. 8, 2010 in PCT/JP10/057279 Filed Apr. 23, 2010.

Office Action issued Jul. 24, 2013, in European Patent Application No. 10 767 171.1.

* cited by examiner

INFORMATION GENERATION APPARATUS, METHOD, PROGRAM, AND RECORDING MEDIUM FOR DERIVING A DECRYPTION KEY FROM ANOTHER DECRYPTION KEY

TECHNICAL FIELD

The present invention relates to an application of information security technology. For example, the present invention relates to hierarchical cryptography in which a decryption key having a limited decryption ability can be derived from another decryption key.

BACKGROUND ART

The technology described in Non-patent literature 1 is a known conventional technology for hierarchical cryptography.

PRIOR ART LITERATURE

Non-Patent Literature

Non-patent literature 1: Craig Gentry, Alice Siverberg, "Hierarchical ID-Based Cryptography," ASIACRYPT 2002, pp. 548-566

DISCLOSURE OF THE INVENTION

Problems to be Solved by the Invention

In the technology described in Non-patent literature 1, a key corresponding to a child node in a tree structure can be derived from a key corresponding to a parent node, but key derivation cannot be implemented in a general semiordered structure s other than a tree structure. For example, in a structure having a parent node A, a parent node B, and a common child node C, it is not possible to derive a key of the common child node C from a key of the parent node A or to derive a key of the common child node C from a key of the parent node B.

Means to Solve the Problems

To solve the foregoing problem, an information generation apparatus according to Claim 1 includes a random number generator adapted to generate a random number $\sigma_Y \in Z_q$ and a random number $\sigma_{Yj} \in Z_q$ corresponding to each element $j \in w(Y)$ of a set $w(Y)$; a main information generator adapted to use the generated random number $\sigma_Y$ to calculate main information $k_Y$ that satisfies $k_Y = \sigma_Y \Sigma_{i \in \{1, \ldots, N-1\} \backslash w(Y)} Y_i b_i^* + b_N^*$; and a derivation information generator adapted to use the generated random number $\sigma_{Yj}$ to calculate derivation information $k_{Yj}$ that satisfies $k_{Yj} = \sigma_{Yj} \Sigma_{e \in \{1, \ldots, N-1\} \backslash w(Y)} Y_i b_i^* + b_j^*$ for each element $j \in w(Y)$ of the set $w(Y)$; where e is a non-degenerate, bilinear function that outputs one element of a cyclic group $G_T$ in response to inputs of N elements $\gamma_L$ ($L=1, \ldots, N$) ($N \geq 2$) of a cyclic group $G_1$ and N elements $\gamma_L^*$ ($L=1, \ldots, N$) of a cyclic group $G_2$; $b_i \in G_1^N$ ($i=1, \ldots, N$) is an N-dimensional basis vector having N elements of the cyclic group $G_1$ as elements; $b_j^* \in G_2^N$ ($j=1, \ldots, N$) is an N-dimensional basis vector having N elements of the cyclic group $G_2$ as elements; a function value obtained when each element of the basis vector $b_i \in G_1^N$ ($i=1, \ldots, N$) and each element of the basis vector $b_j^* \in G_2^N$ ($j=1, \ldots, N$) are put into the bilinear function e is represented by $g_T^{\tau \cdot \delta(i,j)} \in G_T$, using a Kronecker's delta function in which $\delta(i,j)=1_F$ when $i=j$ and $\delta(i,j)=0_F$ when $i \neq j$; $0_F$ is an additive unit element of a finite field $F_q$; $1_F$ is a multiplicative unit element of the finite field $F_q$; $\tau$ is an element of the finite field $F_q$, other than $0_F$; and $g_T$ is a generator of the cyclic group $G_T$; * indicates an indeterminate character; an index Y is $Y=(Y_1, \ldots, Y_{N-1}) \in I=(F_q \cup \{*\})^{N-1}$; and the set $w(Y)$ corresponds to the index Y, and $w(Y)=\{i | Y_i = *\}$.

An information generation apparatus according to Claim 4 includes a storage unit adapted to store main information $k_v$ serving as main information $k_Y$ or corresponding to an index v, derived from the main information $k_Y$ and derivation information $k_{Yj}$, and derivation information $k_{vj}$ serving as the derivation information $k_{Yj}$ or corresponding to the index v, derived from the derivation information $k_{Yj}$; a child random number generator adapted to generate a random number $\sigma_u \in Z_q$; and a main information deriving unit adapted to use the main information $k_v$ and derivation information $k_{vi}$, both of which are read from the storage unit, and the generated random number $\sigma_u$ to calculate main information $k_u$ corresponding to an index u, which satisfies $k_u = \sigma_u \Sigma_{i \in w(v) \backslash w(u)} u_i k_{vi} + k_v$; where e is a non-degenerate, bilinear function that outputs one element of a cyclic group $G_T$ in response to inputs of N elements $\gamma_L$ ($L=1, \ldots, N$) ($N \geq 2$) of a cyclic group $G_1$ and N elements $\gamma_L^*$ ($L=1, \ldots, N$) of a cyclic group $G_2$; $b_i \in G_1^N$ ($i=1, \ldots, N$) is an N-dimensional basis vector having N elements of the cyclic group $G_1$ as elements; $b_j^* \in G_2^N$ ($j=1, \ldots, N$) is an N-dimensional basis vector having N elements of the cyclic group $G_2$ as elements; a function value obtained when each element of the basis vector $b_i \in G_1^N$ ($i=1, \ldots, N$) and each element of the basis vector $b_j^* \in G_2^N$ ($j=1, \ldots, N$) are put into the bilinear function e is represented by $g_T^{\tau \cdot \delta(i,j)} \in G_T$, using a Kronecker's delta function in which $\delta(i,j)=1_F$ when $i=j$ and $\delta(i,j)=0_F$ when $i \neq j$; $0_F$ is an additive unit element of a finite field $F_q$; $1_F$ is a multiplicative unit element of the finite field $F_q$; $\tau$ is an element of the finite field $F_q$, other than $0_F$; and $g_T$ is a generator of the cyclic group $G_T$; * indicates an indeterminate character; an index Y is $Y=(Y_1, \ldots, Y_{N-1}) \in I=(F_q \cup \{*\})^{N-1}$; a set $w(Y)$ corresponding to the index Y is $w(Y)=\{i | Y_i = *\}$; $\sigma_Y \in Z_q$ is a random number; $\sigma_{Yj} \in Z_q$ is a random number corresponding to each element $j \in w(Y)$ of the set $w(Y)$; the main information $k_Y$ corresponds to the index Y and satisfies $k_Y = \sigma_Y \Sigma_{i \in \{1, \ldots, N-1\} \backslash w(Y)} Y_i b_i^* + b_N^*$; the derivation information $k_{Yj}$ corresponds to the index Y and satisfies $k_{Yj} = \sigma_{Yj} \Sigma_{i \in \{1, \ldots, N-1\} \backslash w(Y)} Y_i b_i^* + b_j^*$; * indicates an indeterminate character; the index v is $v=(v_1, \ldots, v_{N-1}) \in I=(F_q \cup \{*\})^{N-1}$; the index u is $u=(u_1, \ldots, u_{N-1}) \in I=(F_q \cup \{*\})^{N-1}$; $w(v)$ is a set corresponding to the index v and $w(v)=\{i | v_i = *\}$; $w(u)$ is a set corresponding to the index u and $w(u)=\{i | u_i = *\}$; $w(u) \subset w(v)$; and $v_i = u_i$ ($i \in \{1, \ldots, N-1\} \backslash w(v)$).

An information generation apparatus according to Claim 6 includes a random number generator adapted to generate a random number $r_Y \in Z_q$; a first main information generator adapted to use the generated random number $r_Y$ to calculate first main information $k_Y$ that satisfies $k_Y = g_2^a (g_3 \Pi_{i \in \{1, \ldots, N-1\} \backslash w(Y)} h_i^{Y_i})^{r_Y}$; a second main information generator adapted to use the generated random number $r_Y$ to calculate second main information $g^{r_Y}$; and a derivation information generator adapted to use the generated random number $r_Y$ to calculate derivation information $k_{Yj}$ that satisfies $k_{Yj} = h_j^{r_Y}$ for each element $j \in w(Y)$ of a set $w(Y)$; where G and $G_T$ are cyclic groups having a prime number order q; g is a generator of the cyclic group G; the cyclic group G has a pairing function e: $G \times G \to G_T$, which makes $g_T = e(g, g)$ a generator of the cyclic group $G_T$; a is a random number selected at random from $Z_p$; g, $g_1 = g^a \in G$, and $g_2$, $g_3$, $h_1, \ldots, h_{N-1} \in G$ randomly selected from the cyclic group G are made publicly available as public keys; * indicates an indeterminate character; an index Y is $Y=(Y_1,\ldots,Y_{N-1})\in I=(F_q\cup\{*\})^{N-1}$; the set $w(Y)$ corresponds to the index Y; and $w(Y)=\{i|Y_i=*\}$.

An information generation apparatus according to Claim 9 includes a random number generator adapted to generate a random number $r_u\in Z_q$; a storage unit adapted to store main information $k_v$ serving as main information $K_Y$ or corresponding to an index v, derived from first main information $k_Y$ and derivation information $k_{Yj}$, and derivation information $k_{vj}$ serving as derivation information $k_{Yj}$ or corresponding to the index v, derived from the derivation information $k_{Yj}$; a first main information deriving unit adapted to use the first main information $k_v$ and derivation information $k_{vi}$, both of which are read from the storage unit, to calculate first main information $k_u$ corresponding to an index u, which satisfies $k_u=k_v(\Pi_{i\in w(v)\backslash w(u)}k_{vi}^{ui})(g_3\Pi_{i\in\{1,\ldots,N-1\}\backslash w(v)}h_i^{vi}\Pi_{i\in w(v)\backslash w(u)}h_i^{ui})^{ru}$; and a second main information deriving unit adapted to use the generated random number $r_u$ to calculate second main information $g^{ru}$; where G and $G_T$ are cyclic groups having a prime number order q; g is a generator of the cyclic group G; the cyclic group G has a pairing function $e: G\times G\to G_T$, which makes $g_T=e(g,g)$ a generator of the cyclic group $G_T$; a is a random number selected at random from $Z_p$; g, $g_1=g^a\in G$, and $g_2, g_3, h_1, \ldots, h_{N-1}\in G$ randomly selected from the cyclic group G are made publicly available as public keys; * indicates an indeterminate character; an index Y is $Y=(Y_1,\ldots,Y_{N-1})\in I=(F_q\cup\{*\})^{N-1}$; a set $w(Y)$ corresponding to the index Y is $w(Y)=\{i|Y_i=*\}$; $r_Y\in Z_q$ is a random number; the first main information $k_Y$ corresponds to the index Y and satisfies $k_Y=g_2^a(g_3\Pi_{i\in\{1,\ldots,N-1\}\backslash w(Y)}h_i^{Yi})^{rY}$; $g^{rY}$ is second main information corresponding to the index Y; the derivation information $k_{Yj}$ corresponds to the index Y and satisfies $k_{Yj}=h_j^{rY}$; * indicates an indeterminate character; the index v is $v=(v_1,\ldots,v_{N-1})\in I=(F_q\cup\{*\})^{N-1}$; $w(v)$ is a set corresponding to the index v and $w(v)=\{i|v_i=*\}$; the index u is $u=(u_1,\ldots,u_{N-1})\in I=(F_q\cup\{*\})^{N-1}$; $w(u)$ is a set corresponding to the index u and $w(u)=\{i|u_i=*\}$; set $w(u)\subset$ set $w(v)$; and $v_i=u_i(i\in\{1,\ldots,N-1\}\backslash w(v))$.

Effects of the Invention

In a structure having a parent node A, a parent node B, and a common child node C, it is possible to derive information of the common child node C from information of the parent node A and to derive information of the common child node C from information of the parent node B.

DETAILED DESCRIPTION OF THE EMBODIMENTS

Figure 1:
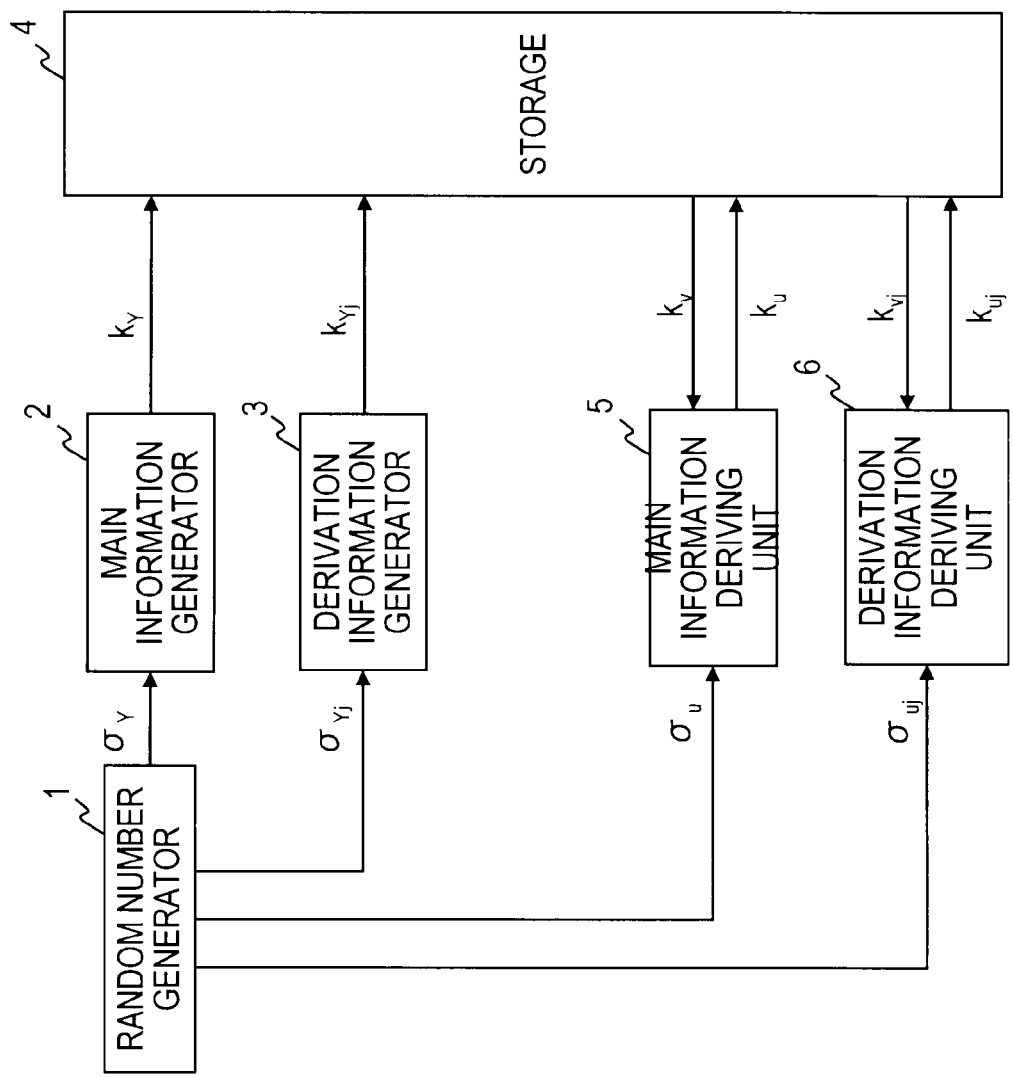
FIG. 1 is an example functional block diagram of an information generation apparatus according to a first embodiment.

Embodiments of the present invention will be described below in detail.
Predicate Encryption An overview of predicate encryption, which is a concept used in a first embodiment, will be described first.

DEFINITIONS

Terms and symbols to be used in the embodiments will be defined first.

Matrix: A matrix represents a rectangular arrangement of elements of a set in which an operation is defined. Not only elements of a ring but also elements of a group can form the matrix.

$(\bullet)^T$: Transposed matrix of "•"
$(\bullet)^{-1}$: Inverse matrix of "•"
∧: Logical AND
∨: Logical OR
Z: Set of integers
k: Security parameter ($k\in Z$, $k>0$)
$\{0,1\}^*$: Binary sequence having a desired bit length. An example is a sequence formed of integers 0 and 1. However, $\{0,1\}^*$ is not limited to sequences formed of integers 0 and 1. $\{0,1\}^*$ is a finite field of order 2 or its extention field.

$\{0,1\}^\zeta$: Binary sequence having a bit length $\zeta$ ($\zeta\in Z$, $\zeta>0$). An example is a sequence formed of integers 0 and 1. However, $\{0,1\}^\zeta$ is not limited to sequences formed of integers 0 and 1. $\{0,1\}^\zeta$ is a finite field of order 2 (when $\zeta=1$) or an extention field obtained by extending the finite field by degree $\zeta$ (when $\zeta>1$).

(+): Exclusive OR operator between binary sequences. For example, the following is satisfied: 10110011(+)11100001=01010010.

$F_q$: Finite field of order q, where q is an integer equal to or larger than 1. For example, the order q is a prime number of a power of a prime number. In other words, the finite field $F_q$ is a prime field or an extention field of the prime field, for example. When the finite field $F_q$ is a prime field, remainder calculations to modulus q can be easily performed, for example. When the finite field $F_q$ is an extention field, remainder calculations modulo an irreducible polynomial can be easily performed, for example. A specific method for configuring a finite field $F_q$ is disclosed, for example, in reference literature 1, "ISO/IEC 18033-2: Information technology—Security techniques—Encryption algorithms—Part 2: Asymmetric ciphers".

$0_F$: Additive unit element of the finite field $F_q$
$1_F$: Multiplicative unit element of the finite field $F_q$
$\delta(i,j)$: Kronecker's delta function. When $i=j$, $\delta(i,j)=1_F$. When $i\neq j$, $\delta(i,j)=0_F$.

E: Elliptic curve defined on the finite field $F_q$. It is defined as a special point O called the point of infinity plus a set of points (x, y) satisfying x, y$\in F_q$ and the Weierstrass equation in an affine coordinate system $$y^2+a_1xy+a_3y=x^3+a_2x^2+a_4x+a_6 \quad (1)$$

where $a_1, a_2, a_3, a_4, a_6\in F_q$. A binary operation + called an elliptic addition can be defined for any two points on the elliptic curve E, and a unary operation − called an elliptic inverse can be defined for any one point on the elliptic curve E. It is well known that a finite set of rational points on the elliptic curve E forms a group with respect to the elliptic addition. It is also well known that an operation called an elliptic scalar multiplication can be defined with the elliptic addition. A specific operation method of elliptic operations such as the elliptic addition on a computer is also well known. (For example, see reference literature 1, reference literature 2, "RFC 5091: Identity-Based Cryptography Standard (IBCS) #1: Supersingular Curve Implementations of the BF and BB1 Cryptosystems", and reference literature 3, Ian F. Blake, Gadiel Seroussi, and Nigel P. Smart, "Elliptic Curves in Cryptography", Pearson Education, ISBN 4-89471-431-0.)

A finite set of rational points on the elliptic curve E has a subgroup of order p ($p \geq 1$). When the number of elements in a finite set of rational points on the elliptic curve E is #E and p is a large prime number that can divide #E without a remainder, for example, a finite set E[p] of p equally divided points on the elliptic curve E forms a subgroup of the finite set of rational points on the elliptic curve E. The p equally divided points on the elliptic curve E are points A on the elliptic curve E which satisfy the elliptic scalar multiplication pA=O.

$G_1$, $G_2$, $G_T$: Cyclic groups of order q. Examples of the cyclic groups $G_1$ and $G_2$ include the finite set E[p] of p equally divided points on the elliptic curve E and subgroups thereof. $G_1$ may equal $G_2$, or $G_1$ may not equal $G_2$. Examples of the cyclic group $G_T$ include a finite set constituting an extention field of the finite field $F_q$. A specific example thereof is a finite set of the p-th root of 1 in the algebraic closure of the finite field $F_q$.

In the embodiments, operations defined on the cyclic groups $G_1$ and $G_2$ are expressed as additions, and an operation defined on the cyclic group $G_T$ is expressed as a multiplication. More specifically, $\chi \cdot \Omega \in G_1$ for $\chi \in F_q$ and $\Omega \in G_1$ means that the operation defined in the cyclic group $G_1$ is applied to $\Omega \in G_1 \chi$ times, and $\Omega_1 + \Omega_2 \in G_1$ for $\Omega_1, \Omega_2 \in G_1$ means that the operation defined in the cyclic group $G_1$ is applied to $\Omega_1 \in G_1$ and $\Omega_2 \in G_1$. In the same way, $\chi \cdot \Omega \in G_2$ for $\chi \in F_q$ and $\Omega \in G_2$ means that the operation defined in the cyclic group $G_2$ is applied to $\Omega \in G_2$, times, and $\Omega_1 + \Omega_2 \in G_2$ for $\Omega_1, \Omega_2 \in G_2$ means that the operation defined in the cyclic group $G_2$ is applied to $\Omega_1 \in G_2$ and $\Omega_2 \in G_2$. In contrast, $\Omega^\chi \in G_T$ for $\chi \in F_q$ and $\Omega \in G_T$ means that the operation defined in the cyclic group $G_T$ is applied to $\Omega \in G_T \chi$ times, and $\Omega_1 \cdot \Omega_2 \in G_T$ for $\Omega_1, \Omega_2 \in G_T$ means that the operation defined in the cyclic group $G_T$ is applied to $\Omega_1 \in G_T$ and $\Omega_2 \in G_T$.

$G_1^{n+1}$: Direct product of (n+1) cyclic groups $G_1$ ($n \geq 1$)
$G_2^{n+1}$: Direct product of (n+1) cyclic groups $G_2$
$g_1, g_2, g_T$: Generators of the cyclic groups $G_1, G_2, G_T$
V: (n+1)-dimensional vector space formed of the direct product of the (n+1) cyclic groups $G_1$
V*: (n+1)-dimensional vector space formed of the direct product of the (n+1) cyclic groups $G_2$
e: Function (bilinear function) for calculating a non-degenerate bilinear map that maps the direct product $G_1^{n+1} \times G_2^{n+1}$ of the direct product $G_1^{n+1}$ and the direct product $G_2^{n+1}$ to the cyclic group $G_T$. The bilinear function e receives (n+1) elements $\gamma_L$ (L=1, ..., n+1) ($n \geq 1$) of the cyclic group $G_1$ and (n+1) elements $\gamma_L^*$ (L=1, ..., n+1) of the cyclic group $G_2$ and outputs one element of the cyclic group $G_T$.

$$e: G_1^{n+1} \times G_2^{n+1} \to G_T \quad (2)$$

The bilinear function e satisfies the following characteristics:

Bilinearity: The following relationship is satisfied for all $\Gamma_1 \in G_1^{n+1}$, $\Gamma_2 \in G_2^{n+1}$, and $\nu, \kappa \in F_q$ $$e(\nu \cdot \Gamma_1, \kappa \cdot \Gamma_2) = e(\Gamma_1, \Gamma_2)^{\nu \cdot \kappa} \quad (3)$$

Non-degeneracy: This function does not map all $$\Gamma_1 \in G_1^{n+1}, \Gamma_2 \in G_2^{n+1} \quad (4)$$

onto the unit element of the cyclic group $G_T$.

Computability: There exists an algorithm for efficiently calculating $e(\Gamma_1, \Gamma_2)$ for all $\Gamma_1 \in G_1^{n+1}$, $\Gamma_2 \in G_2^{n+1}$.

In the embodiments, the following function for calculating a non-degenerate bilinear map that maps the direct product $G_1 \times G_2$ of the cyclic group $G_1$ and the cyclic group $G_2$ to the cyclic group $G_T$ constitutes the bilinear function e.

$$\text{Pair}: G_1 \times G_2 \to G_T \quad (5)$$

The bilinear function e receives an (n+1)-dimensional vector $(\gamma_1, \ldots, \gamma_{n+1})$ formed of (n+1) elements $\gamma_L$ (L=1, ..., n+1) of the cyclic group $G_1$ and an (n+1)-dimensional vector $(\gamma_1^*, \ldots, \gamma_{n+1}^*)$ formed of (n+1) elements $\gamma_L^*$ (L=1, ..., n+1) of the cyclic group $G_2$ and outputs one element of the cyclic group $G_T$.

$$e = \Pi_{L=1}^{n+1} \text{Pair}(\gamma_L, \gamma_L^*) \quad (6)$$

The bilinear function Pair receives one element of the cyclic group $G_1$ and one element of the cyclic group $G_2$ and outputs one element of the cyclic group $G_T$, and satisfies the following characteristics:

Bilinearity: The following relationship is satisfied for all $\Omega_1 \in G_1$, $\Omega_2 \in G_2$, and $\nu, \kappa \in F_q$ $$\text{Pair}(\nu \cdot \Omega_1, \kappa \cdot \Omega_2) = \text{Pair}(\Omega_1, \Omega_2)^{\nu \cdot \kappa} \quad (7)$$

Non-degeneracy: This function does not map all $$\Omega_1 \in G_1, \Omega_2 \in G_2 \quad (8)$$

onto the unit element of the cyclic group $G_T$.

Computability: There exists an algorithm for efficiently calculating $\text{Pair}(\Omega_1, \Omega_2)$ for all $\Omega_1 \in G_1$, $\Omega_2 \in G_2$.

A specific example of the bilinear function Pair is a function for performing a pairing operation such as Weil pairing or Tate pairing. (See reference literature 4, Alfred. J. Menezes, "Elliptic Curve Public Key Cryptosystems", Kluwer Academic Publishers, ISBN 0-7923-9368-6, pp. 61-81, for example.) A modified pairing function $e(\Omega_1, \text{phi}(\Omega_2))$ ($\Omega_1 \in G_1$, $\Omega_2 \in G_2$) obtained by combining a function for performing a pairing operation, such as Tate pairing, and a predetermined function phi according to the type of the elliptic curve E may be used as the bilinear function Pair (see reference literature 2, for example). As the algorithm for performing a pairing operation on a computer, the Miller algorithm (see reference literature 5, V. S. Miller, "Short Programs for Functions on Curves", 1986, http://crypto.stanford.edu/miller/miller.pdf) or some other known algorithm can be used. Methods for configuring a cyclic group and an elliptic curve used to efficiently perform a pairing operation have been known. (For example, see reference literature 2; reference literature 6, A. Miyaji, M. Nakabayashi, and S. Takano, "New Explicit Conditions of Elliptic Curve Traces for FR Reduction", IEICE Trans. Fundamentals, Vol. E84-A, No. 5, pp. 1234-1243, May 2001; reference literature 7, P. S. L. M. Barreto, B. Lynn, M. Scott, "Constructing Elliptic Curves with Prescribed Embedding Degrees", Proc. SCN '2002, LNCS 2576, pp. 257-267, Springer-Verlag. 2003; and reference literature 8, R. Dupont, A. Enge, F. Morain, "Building Curves with Arbitrary Small MOV Degree over Finite Prime Fields", http://eprint.iacr.org/2002/094/).

$a_i$ (i=1, ..., n+1): (n+1)-dimensional basis vectors having (n+1) elements of the cyclic group $G_1$ as elements. An example of the basis vectors $a_i$ is an (n+1)-dimensional basis vector having $\kappa_1 \cdot g_1 \in G_1$ as an i-dimensional element and the unit element (expressed as "0" in additive expression) of the cyclic group $G_1$ as the remaining n elements. In that case, the elements of the (n+1)-dimensional basis vectors $a_i$ (i=1, ..., n+1) can be listed as follows:

$$a_1 = (\kappa_1 \cdot g_1, 0, 0, \ldots, 0) \quad (9)$$

$$a_2 = (0, \kappa_1 \cdot g_1, 0, \ldots, 0)$$

$$\ldots$$

$$a_{n+1} = (0, 0, 0, \ldots, \kappa_1 \cdot g_1)$$

Here, $\kappa_1$ is a constant formed of an element of the finite field $F_q$ other than the additive unit element $0_F$. An example of $\kappa_1 \in F_q$ is $\kappa_1 = 1_F$. The basis vectors $a_i$ are orthogonal bases. Each (n+1)-dimensional vector having (n+1) elements of the cyclic group $G_1$ as elements is expressed by a linear sum of (n+1)-dimensional basis vectors $a_i$ (i=1, ..., n+1). Therefore, the (n+1)-dimensional basis vectors $a_i$ span the vector space V, described earlier.

$a_i^*$ (i=1, ..., n+1): (n+1)-dimensional basis vectors having (n+1) elements of the cyclic group $G_2$ as elements. An example of the basis vectors $a_i^*$ is an (n+1)-dimensional basis vector having $\kappa_2 \cdot g_2 \in G_2$ as an i-dimensional element and the unit element (expressed as "0" in additive expression) of the cyclic group $G_2$ as the remaining n elements. In that case, the elements of the (n+1)-dimensional basis vectors $a_i^*$ (i=1, ..., n+1) can be listed as follows:

$$a_1^* = (\kappa_2 \cdot g_2, 0, 0, \ldots, 0) \quad (10)$$

$$a_2^* = (0, \kappa_2 \cdot g_2, 0, \ldots, 0)$$

$$\ldots$$

$$a_{n+1}^* = (0, 0, 0, \ldots, \kappa_2 \cdot g_2)$$

Here, $\kappa_2$ is a constant formed of an element of the finite field $F_q$ other than the additive unit element $0_F$. An example of $\kappa_2 \in F_q$ is $\kappa_2 = 1_F$. The basis vectors $a_i^*$ are orthogonal bases. Each (n+1)-dimensional vector having (n+1) elements of the cyclic group $G_2$ as elements is expressed by a linear sum of (n+1)-dimensional basis vectors $a_i^*$ (i=1, ..., n+1). Therefore, the (n+1)-dimensional basis vectors $a_i^*$ span the vector space V*, described earlier.

The basis vectors $a_i$ and the basis vectors $a_i^*$ satisfy the following expression for an element $\tau = \kappa_1 \cdot \kappa_2$ of the finite field $F_q$ other than $0_F$:

$$e(a_i, a_j^*) = g_T^{\tau \delta(i,j)} \quad (11)$$

When i=j, the following expression is satisfied from Expressions (6) and (7).

$$e(a_i, a_j^*) = \text{Pair}(\kappa_1 \cdot g_1, \kappa_2 \cdot g_2) \cdot \text{Pair}(0,0) \cdot \ldots \cdot \text{Pair}(0,0)$$

$$= \text{Pair}(g_1, g_2)^{\kappa_1 \kappa_2} \cdot \text{Pair}(g_1, g_2)^{0 \cdot 0} \cdot \ldots \cdot \text{Pair}(g_1, g_2)^{0 \cdot 0}$$

$$= \text{Pair}(g_1, g_2)^{\kappa_1 \kappa_2} = g_T^{\tau}$$

When i≠j, $e(a_i, a_j^*)$ does not include $\text{Pair}(\kappa_1 \cdot g_1, \kappa_2 \cdot g_2)$ and is the product of $\text{Pair}(\kappa_1 \cdot g_1, 0)$, $\text{Pair}(0, \kappa_2 \cdot g_2)$, and $\text{Pair}(0,0)$. In addition, the following expression is satisfied from Expression (7).

$$\text{Pair}(g_1, 0) = \text{Pair}(0, g_2) = \text{Pair}(g_1, g_2)^0$$

Therefore, when i≠j, the following expression is satisfied.

$$e(a_i, a_j^*) = e(g_1, g_2)^0 = g_T^0$$

Especially when $\tau = \kappa_1 \cdot \kappa_2 = 1_F$ (for example, $\kappa_1 = \kappa_2 = 1_F$), the following expression is satisfied.

$$e(a_i, a_j^*) = g_T^{\delta(i,j)} \quad (12)$$

Here, $g_T^0 = 1$ is the unit element of the cyclic group $G_T$, and $g_T^1 = g_T$ is a generator of the cyclic group $G_T$. In that case, the basis vectors $a_i$ and the basis vectors $a_i^*$ are dual normal orthogonal bases, and the vector space V and the vector space V* are a dual vector space that constitutes bilinear mapping (dual pairing vector space (DPVS)).

A: An (n+1) row by (n+1) column matrix having the basis vectors $a_i$ (i=1, ..., n+1) as elements. When the basis vectors $a_i$ (i=1, ..., n+1) are expressed by Expression (9), for example, the matrix A is as follows:

$$A = \begin{pmatrix} a_1 \\ a_2 \\ \vdots \\ a_{n+1} \end{pmatrix} = \begin{pmatrix} \kappa_1 \cdot g_1 & 0 & \cdots & 0 \\ 0 & \kappa_1 \cdot g_1 & & \vdots \\ \vdots & & \ddots & 0 \\ 0 & \cdots & 0 & \kappa_1 \cdot g_1 \end{pmatrix} \quad (13)$$

A*: An (n+1) row by (n+1) column matrix having the basis vectors $a_i^*$ (i=1, ..., n+1) as elements. When the basis vectors $a_i^*$ (i=1, ..., n+1) are expressed by Expression (10), for example, the matrix A* is as follows:

$$A^* = \begin{pmatrix} a_1^* \\ a_2^* \\ \vdots \\ a_{n+1}^* \end{pmatrix} = \begin{pmatrix} \kappa_2 \cdot g_1 & 0 & \cdots & 0 \\ 0 & \kappa_2 \cdot g_2 & & \vdots \\ \vdots & & \ddots & 0 \\ 0 & \cdots & 0 & \kappa_2 \cdot g_2 \end{pmatrix} \quad (14)$$

X: An (n+1) row by (n+1) column matrix having elements of the finite field $F_q$ as elements. The matrix X is used to apply coordinate conversion to the basis vectors $a_i$. When the element located at the i-th row and the j-th column in the matrix X is expressed as $\chi_{i,j} \in F_q$, the matrix X is as follows:

$$X = \begin{pmatrix} \chi_{1,1} & \chi_{1,2} & \cdots & \chi_{1,n+1} \\ \chi_{2,1} & \chi_{2,2} & & \vdots \\ \vdots & & \ddots & \vdots \\ \chi_{n+1,1} & \chi_{n+1,2} & \cdots & \chi_{n+1,n+1} \end{pmatrix} \quad (15)$$

Here, each element $\chi_{i,j}$ of the matrix X is called a conversion coefficient.

X*: Transposed matrix of the inverse matrix of the matrix X. $X^* = (X^{-1})^T$. The matrix X* is used to apply coordinate conversion to the basis vectors $a_i^*$. When the element located at the i-th row and the j-th column in the matrix X* is expressed as $\chi_{i,j}^* \in F_q$, the matrix X* is as follows:

$$X^* = \begin{pmatrix} \chi_{1,1}^* & \chi_{1,2}^* & \cdots & \chi_{1,n+1}^* \\ \chi_{2,1}^* & \chi_{2,2}^* & & \vdots \\ \vdots & & \ddots & \vdots \\ \chi_{n+1,1}^* & \chi_{n+1,2}^* & \cdots & \chi_{n+1,n+1}^* \end{pmatrix} \quad (16)$$

Here, each element $\chi_{i,j}^*$ of the matrix X* is called a conversion coefficient.

In that case, when an (n+1) row by (n+1) column unit matrix is called I, $X \cdot (X^*)^T = I$. In other words, for the unit matrix shown below, $$I = \begin{pmatrix} 1_F & 0_F & \cdots & 0_F \\ 0_F & 1_F & & \vdots \\ \vdots & & \ddots & 0_F \\ 0_F & 0_F & \cdots & 1_F \end{pmatrix} \quad (17)$$

the following expression is satisfied.

$$\begin{pmatrix} \chi_{1,1} & \chi_{1,2} & \cdots & \chi_{1,n+1} \\ \chi_{2,1} & \chi_{2,2} & & \vdots \\ \vdots & & \ddots & \vdots \\ \chi_{n+1,1} & \chi_{n+1,2} & \cdots & \chi_{n+1,n+1} \end{pmatrix} \cdot \begin{pmatrix} \chi_{1,1}^* & \chi_{2,1}^* & \cdots & \chi_{n+1,1}^* \\ \chi_{1,2}^* & \chi_{2,2}^* & & \vdots \\ \vdots & & \ddots & \vdots \\ \chi_{1,n+1}^* & \chi_{2,n+1}^* & \cdots & \chi_{n+1,n+1}^* \end{pmatrix} = \begin{pmatrix} 1_F & 0_F & \cdots & 0_F \\ 0_F & 1_F & & \vdots \\ \vdots & & \ddots & 0_F \\ 0_F & 0_F & \cdots & 1_F \end{pmatrix} \quad (18)$$

Here, (n+1)-dimensional vectors will be defined below.

$$\vec{\chi_i} = (\chi_{i,1}, \ldots, \chi_{i,n+1}) \quad (19)$$

$$\vec{\chi_j}^* = (\chi_{j,1}^*, \ldots, \chi_{j,n+1}^*) \quad (20)$$

The inner product of the (n+1)-dimensional vectors $\vec{\chi_i}$ and $\vec{\chi_j}^*$ satisfies the following expression from Expression (18).

$$\vec{\chi_i} \cdot \vec{\chi_j}^* = \delta(i,j) \quad (21)$$

$b_i$: (n+1)-dimensional basis vectors having (n+1) elements of the cyclic group $G_1$ as elements. The basis vectors $b_i$ are obtained by applying coordinate conversion to the basis vectors $a_i$ (i=1, ..., n+1) by using the matrix X. Specifically, the basis vectors $b_i$ are obtained by the following calculation $$b_i = \sum_{j=1}^{n+1} \chi_{i,j} \cdot a_j \quad (22)$$

When the basis vectors $a_j$ (j=1, ..., n+1) are expressed by Expression (9), each element of the basis vectors $b_i$ is shown below.

$$b_i = (\chi_{i,1} \cdot \kappa_1 \cdot g_1, \chi_{i,2} \cdot \kappa_1 \cdot g_1, \ldots, \chi_{i,n+1} \cdot \kappa_1 \cdot g_1) \quad (23)$$

Each (n+1)-dimensional vector having (n+1) elements of the cyclic group $G_1$ as elements is expressed by a linear sum of (n+1)-dimensional basis vectors $b_i$ (i=1, ..., n+1). Therefore, the (n+1)-dimensional basis vectors $b_i$ span the vector space V, described earlier.

$b_i^*$: (n+1)-dimensional basis vectors having (n+1) elements of the cyclic group $G_2$ as elements. The basis vectors $b_i^*$ are obtained by applying coordinate conversion to the basis vectors $a_i^*$ (i=1, ..., n+1) by using the matrix $X^*$. Specifically, the basis vectors $b_i^*$ are obtained by the following calculation $$b_i^* = \sum_{j=1}^{n+1} \chi_{i,j}^* \cdot a_j^* \quad (24)$$

When the basis vectors $a_j$ (j=1, ..., n+1) are expressed by Expression (10), each element of the basis vectors $b_i^*$ are shown below.

$$b_i^* = (\chi_{i,1}^* \cdot \kappa_2 \cdot g_2, \chi_{i,2}^* \cdot \kappa_2 \cdot g_2, \ldots, \chi_{i,n+1}^* \cdot \kappa_2 \cdot g_2) \quad (25)$$

Each (n+1)-dimensional vector having (n+1) elements of the cyclic group $G_2$ as elements is expressed by a linear sum of (n+1)-dimensional basis vectors $b_i^*$ (i=1, ..., n+1). Therefore, the (n+1)-dimensional basis vectors $b_i^*$ span the vector space $V^*$, described earlier.

The basis vectors $b_i$ and the basis vectors $b_i^*$ satisfy the following expression for the elements $\tau = \kappa_1 \cdot \kappa_2$ of the finite field $F_q$ other than $0_F$:

$$e(b_i, b_j^*) = g_T^{\tau \cdot \delta(i,j)} \quad (26)$$

The following expression is satisfied from Expressions (6), (21), (23), and (25).

$$e(b_i, b_j^*) = \prod_{L=1}^{n+1} \text{Pair}(\chi_{i,L} \cdot \kappa_1 \cdot g_1, \chi_{j,L}^* \cdot \kappa_2 \cdot g_2)$$

$$= \text{Pair}(\chi_{i,1} \cdot \kappa_1 \cdot g_1, \chi_{j,1}^* \cdot \kappa_2 \cdot g_2) \cdot \ldots \cdot (\chi_{i,n} \cdot \kappa_1 \cdot g_1, \chi_{j,n}^* \cdot \kappa_2 \cdot g_2) \times$$

$$\text{Pair}(\chi_{j,n+1} \cdot \kappa_1 \cdot g_1, \chi_{j,n+1}^* \cdot \kappa_2 \cdot g_2)$$

$$= \text{Pair}(g_1, g_2)^{\kappa_1 \cdot \kappa_2 \cdot \chi_{i,1} \cdot \chi_{j,1}^*} \cdot \ldots \cdot \text{Pair}(g_1, g_2)^{\kappa_1 \cdot \kappa_2 \cdot \chi_{i,2} \cdot \chi_{j,2}^*} \times$$

$$\text{Pair}(g_1, g_2)^{\kappa_1 \cdot \kappa_2 \cdot \chi_{i,n+1} \cdot \chi_{j,n+1}^*}$$

$$= \text{Pair}(g_1, g_2)^{\kappa_1 \cdot \kappa_2 (\chi_{i,1} \cdot \chi_{j,1}^* + \chi_{i,2} \cdot \chi_{j,2}^* + \cdots + \chi_{i,n+1} \cdot \chi_{j,n+1}^*)}$$

$$= \text{Pair}(g_1, g_2)^{\kappa_1 \cdot \kappa_2 \cdot \vec{\chi_i} \cdot \vec{\chi_j}^*}$$

$$= \text{Pair}(g_1, g_2)^{\tau \cdot \delta(i,j)} = g_T^{\tau \cdot \delta(i,j)}$$

Especially when $\tau = \kappa_1 \cdot \kappa_2 = 1_F$ (for example, $\kappa_1 = \kappa_2 = 1_F$), the following expression is satisfied.

$$e(b_i, b_j^*) = g_T^{\delta(i,j)} \quad (27)$$

In that case, the basis vectors $b_i$ and the basis vectors $b_i^*$ are the dual normal orthogonal basis of a dual pairing vector space (the vector space V and the vector space $V^*$).

As long as Expression (26) is satisfied, the basis vectors $a_i$ and $a_i^*$ other than those shown in Expressions (9) and (10) as examples, and the basis vectors $b_i$ and $b_i^*$ other than those shown in Expressions (22) and (24) as examples may be used.

B: An (n+1) row by (n+1) column matrix having the basis vectors $b_i$ (i=1, ..., n+1) as elements. $B = X \cdot A$ is satisfied. When the basis vectors $b_i$ are expressed by Expression (23), for example, the matrix B is as follows:

$$B = \begin{pmatrix} b_1 \\ b_2 \\ \vdots \\ b_{n+1} \end{pmatrix} \quad (28)$$

$$= \begin{pmatrix} \chi_{1,1} \cdot \kappa_1 \cdot g_1 & \chi_{1,2} \cdot \kappa_1 \cdot g_1 & \cdots & \chi_{1,n+1} \cdot \kappa_1 \cdot g_1 \\ \chi_{2,1} \cdot \kappa_1 \cdot g_1 & \chi_{2,2} \cdot \kappa_1 \cdot g_1 & & \vdots \\ \vdots & & \ddots & \chi_{n,n+1} \cdot \kappa_1 \cdot g_1 \\ \chi_{n+1,1} \cdot \kappa_1 \cdot g_1 & \cdots & \chi_{n+1,n} \cdot \kappa_1 \cdot g_1 & \chi_{n+1,n+1} \cdot \kappa_1 \cdot g_1 \end{pmatrix}$$

$B^*$: An (n+1) row by (n+1) column matrix having the basis vectors $b_i^*$ (i=1, ..., n+1) as elements. $B^* = X^* \cdot A^*$ is satisfied. When the basis vectors $b_i^*$ (i=1, ..., n+1) are expressed by Expression (25), for example, the matrix $B^*$ is as follows:

$$B^* = \begin{pmatrix} b_1^* \\ b_2^* \\ \vdots \\ b_{n+1}^* \end{pmatrix} \quad (29)$$

$$= \begin{pmatrix} \chi^*_{1,1} \cdot \kappa_2 \cdot g_2 & \chi^*_{1,2} \cdot \kappa_2 \cdot g_2 & \cdots & \chi^*_{1,n+1} \cdot \kappa_2 \cdot g_2 \\ \chi^*_{2,1} \cdot \kappa_2 \cdot g_2 & \chi^*_{2,2} \cdot \kappa_2 \cdot g_2 & & \vdots \\ \vdots & & \ddots & \chi^*_{n,n+1} \cdot \kappa_2 \cdot g_2 \\ \chi^*_{n+1,1} \cdot \kappa_2 \cdot g_2 & \cdots & \chi^*_{n+1,n} \cdot \kappa_2 \cdot g_2 & \chi^*_{n+1,n+1} \cdot \kappa_2 \cdot g_2 \end{pmatrix}$$

$\vec{w}$: An n-dimensional vector having elements of the finite field $F_q$ as elements.

$$\vec{w} = (w_1, \ldots, w_n) \in F_q^n \tag{30}$$

$w_\mu$: The μ-th (t=1, ..., n) element of the n-dimensional vector.

$\vec{v}$: An n-dimensional vector having elements of the finite field $F_q$ as elements.

$$\vec{v} = (v_1, \ldots, v_n) \in F_q^n \tag{31}$$

$v_\mu$: The μ-th (μ=1, ..., n) element of the n-dimensional vector.

Collision-resistant function: A function h that satisfies the following condition with respect to a sufficiently larger security parameter k, or a function regarded as such.

$$Pr[A(h) = (x,y) | h(x) = h(y) \wedge x \neq y] < \epsilon(k) \tag{32}$$

Here, Pr[•] is the probability of the event [•]; A(h) is a probability polynomial time algorithm for calculating x and y (x≠y) that satisfy h(x)=h(y) for a function h; and ε(k) is a polynomial for the security parameter k. An example collision-resistant function is a hash function such as the cryptographic hash function disclosed in reference literature 1.

Injective function: A function by which each element belonging to a value range is expressed as the image of only one element in the definition range, or a function regarded as such.

Quasi-random function: A function belonging to a subset $\phi_\zeta$ when a probability polynomial time algorithm cannot distinguish between the subset $\phi_\zeta$ and its whole set $\Phi_\zeta$, or a function regarded as such. The set $\Phi_\zeta$ is a set of all functions that map an element of a set $\{0, 1\}^\zeta$ to an element of the set $\{0, 1\}^\zeta$. An example quasi-random function is a hash function such as that described above.

$H_1$: A collision-resistant function that receives two binary sequences $(\omega_1, \omega_2) \in \{0, 1\}^k \times \{0, 1\}^*$ and outputs two elements $(\psi_1, \psi_2) \in F_q \times F_q$ of the finite field $F_q$.

$$H_1: \{0,1\}^k \times \{0,1\}^* \to F_q \times F_q \tag{33}$$

An example of the function $H_1$ is a function that outputs two elements $(\psi_1, \psi_2) \in F_q \times F_q$ of the finite field $F_q$ in response to the connected bits $\omega_1 \| \omega_2$ of input $\omega_1$ and $\omega_2$. This function includes calculations with a hash function such as the cryptographic hash function disclosed in reference literature 1, a binary-sequence-to-integer conversion function (octet string/integer conversion), and a binary-sequence-to-finite-field-element conversion function (octet string and integer/finite field conversion). It is preferred that the function $H_1$ be a quasi-random function.

$H_2$: A collision-resistant function that receives an element of the cyclic group $G_T$ and a binary sequence $(\xi, \omega_2) \in G_T \times \{0, 1\}^*$ and outputs one element $\psi \in F_q$ of the finite field $F_q$.

$$H_2: G_T \times \{0,1\}^* \to F_q \tag{34}$$

An example of the function $H_2$ is a function that receives an element $\xi \in G_T$ of the cyclic group $G_T$ and a binary sequence $\omega_2 \in \{0, 1\}^*$, inputs the element $\xi \in G_T$ of the cyclic group $G_T$ to a finite-field-element-to-binary-sequence conversion function (octet string and integer/finite field conversion) disclosed in reference literature 1 to obtain a binary sequence, applies a hash function such as the cryptographic hash function disclosed in reference literature 1 to the connected bits of the obtained binary sequence and the binary sequence $\omega_2 \in \{0, 1\}^*$, performs the binary-sequence-to-finite-field-element conversion function (octet string and integer/finite field conversion), and outputs one element $\psi \in F_q$ of the finite field $F_q$. It is preferred from a security viewpoint that the function $H_2$ be a quasi-random function.

R: An injective function that receives an element $\xi \in G_T$ of the cyclic group $G_T$ and outputs one binary sequence $\omega \in \{0, 1\}^k$.

$$R: G_T \to \{0,1\}^k \tag{35}$$

An example of the injective function R is a function that receives an element $\xi \in G_T$ of the cyclic group $G_T$, performs calculations with the finite-field-element-to-binary-sequence conversion function (octet string and integer/finite field conversion) and then with a hash function such as the KDF (key derivation function) disclosed in reference literature 1, and outputs one binary sequence $\omega \in \{0, 1\}^k$. From a security viewpoint, it is preferred that the function R be a collision-resistant function, and it is more preferred that the function R be a quasi-random function.

Enc: A common key encryption function that indicates encryption processing of a common key cryptosystem. Example common key cryptosystems are Camellia and AES.

$Enc_K(M)$: Ciphertext obtained by encrypting plaintext M by the common key encryption function Enc with the use of a common key K.

Dec: A common key decryption function that indicates decryption processing of the common key cryptosystem.

$Dec_K(C)$: A decryption result obtained by decrypting ciphertext C by the common key decryption function Dec with the use of the common key K.

Inner Product Predicate Encryption

The basic configuration of inner product predicate encryption will be described below.

Predicate Encryption

Predicate encryption (sometimes called function encryption) means that ciphertext can be decrypted when a combination of attribute information and predicate information makes a predetermined logical expression true. One of the attribute information and predicate information is embedded in the ciphertext and the other is embedded in key information. The configuration of conventional predicate encryption is, for example, disclosed in reference literature 9, Jonathan Katz, Amit Sahai and Brent Waters., "Predicate Encryption Supporting Disjunctions, Polynomial Equations, and Inner Products", one of four papers from Eurocrypt 2008 invited by the Journal of Cryptology.

Inner Product Predicate Encryption

Inner product predicate encryption means that ciphertext can be decrypted when the inner product of attribute information and predicate information handled as vectors is zero. In inner product predicate encryption, an inner product of zero is equivalent to a logical expression of true.

Relationship Between Logical Expression and Polynomial

In inner product predicate encryption, a logical expression formed of a logical OR(s) and/or a logical AND(s) is expressed by a polynomial.

The logical OR $(x = \eta_1) \vee (x = \eta_2)$ of statement 1 indicating that x is $\eta_1$ and statement 2 indicating that x is $\eta_2$ is expressed by the following polynomial.

$$(x - \eta_1) \cdot (x - \eta_2) \tag{36}$$

Then, the relationships between true values and the function values of Expression (36) are shown in the following table.

TABLE 1

| Statement 1 ($x = \eta_1$) | Statement 2 ($x = \eta_2$) | Logical OR ($x = \eta_1$)∨($x = \eta_2$) | Function value ($x = \eta_1$)·($x = \eta_2$) |
|---|---|---|---|
| True | True | True | 0 |
| True | False | True | 0 |
| False | True | True | 0 |
| False | False | False | Other than 0 |

As understood from Table 1, when the logical OR $(x=\eta_1)\vee(x=\eta_2)$ is true, the function value of Expression (36) is zero; and when the logical OR $(x=\eta_1)\vee(x=\eta_2)$ is false, the function value of Expression (36) is a value other than zero. In other words, the logical OR $(x=\eta_1)\vee(x=\eta_2)$ of true is equivalent to the function value of zero in Expression (36). Therefore, the logical OR can be expressed by Expression (36).

The logical AND $(x=\eta_1)\wedge(x=\eta_2)$ of statement 1 indicating that x is $\eta_1$ and statement 2 indicating that x is $\eta_2$ is expressed by the following polynomial $$\tau_1 \cdot (x-\eta_1)+\tau_2 \cdot (x-\eta_2) \tag{37}$$

where $\tau_1$ and $\tau_2$ are random numbers. Then, the relationships between true values and the function values of Expression (37) are shown in the following table.

TABLE 2

| Statement 1 ($x = \eta_1$) | Statement 2 ($x = \eta_2$) | Logical AND ($x = \eta_1$)∧($x = \eta_2$) | Function value $\iota_1 \cdot (x - \eta_1) + \iota_2 \cdot (x - \eta_2)$ |
|---|---|---|---|
| True | True | True | 0 |
| True | False | False | Other than 0 |
| False | True | False | Other than 0 |
| False | False | False | Other than 0 |

As understood from Table 2, when the logical AND $(x=\eta_1)\wedge(x=\eta_2)$ is true, the function value of Expression (37) is zero; and when the logical AND $(x=\eta_1)\wedge(x=\eta_2)$ is false, the function value of Expression (37) is a value other than zero. In other words, a logical AND $(x=\eta_1)\wedge(x=\eta_2)$ of true is equivalent to a function value of zero in Expression (37). Therefore, the logical AND can be expressed by Expression (37).

As described above, by using Expressions (36) and (37), a logical expression formed of a logical OR(s) and/or a logical AND(s) can be expressed by a polynomial f(x). An example will be shown below.

Logical expression: $\{(x=\eta_1)\vee(x=\eta_2)\vee(x=\eta_3)\}\wedge(x=\eta_4)\wedge(x=\eta_5)$ Polynomial: $f(x)=\tau_1 \cdot \{(x-\eta_1)\cdot(x-\eta_2)\cdot(X-\eta_3)\}+\tau_2 \cdot (x-=\eta_4)+\tau_3 \cdot (x-=\eta_5)$ In Expression (36), one indeterminate element x is used to express the logical OR. A plurality of indeterminate elements can also be used to express a logical OR. For example, two indeterminate elements $x_0$ and $x_1$ are used to express the logical OR $(x_0=\eta_0)\vee(x_1=\eta_1)$ of statement 1 indicating that $x_0$ is $\eta_0$ and statement 2 indicating that $x_1$ is $\eta_1$ by the following polynomial.

$$(x_0-\eta_0)\cdot(x_1-\eta_1)$$

Three or more indeterminate elements can also be used to express a logical OR by a polynomial.

In Expression (37), one indeterminate element x is used to express the logical AND. A plurality of indeterminate elements can also be used to express a logical AND. For example, the logical AND $(x_0=\eta_0)\wedge(x_1=\eta_1)$ of statement 1 indicating that $x_0$ is $\eta_0$ and statement 2 indicating that $x_1$ is $\eta_1$ can be expressed by the following polynomial.

$$\tau_0 \cdot (x_0-\eta_0)+\tau_1 \cdot (x_1-\eta_1)$$

Three or more indeterminate elements can also be used to express a logical AND by a polynomial.

A logical expression that includes a logical OR(s) and/or a logical AND(s) is expressed with H(H≥1) types of indeterminate elements $x_0, \ldots, x_{H-1}$ as the polynomial $f(x_0, \ldots, x_{H-1})$. It is assumed that a statement for each of the indeterminate elements $x_0, \ldots, x_{H-1}$ is "$x_h$ is $\eta_h$", where $\eta_h$ (h=0, ..., H−1) is a constant determined for each statement. Then, in the polynomial $f(x_0, \ldots, x_{H-1})$ indicating the logical expression, the statement indicating that an indeterminate element $x_h$ is a constant $\eta_h$ is expressed by the polynomial indicating the difference between the indeterminate element $x_h$ and the constant $\eta_h$; the logical OR of statements is expressed by the product of the polynomials indicating the statements; and the logical AND of statements or the logical ORs of statements is expressed by a linear OR of the polynomials indicating the statements or the logical ORs of statements. For example, five indeterminate elements $x_0, \ldots, x_4$ are used to express a logical expression $$\{(x_0=\eta_0)\vee(x_1=\eta_1)\vee(x_2=\eta_2)\}\wedge(x_3=\eta_3)\wedge(x_4=\eta_4)$$

by the following polynomial $$f(x_0, \ldots, x_4)=\tau_0 \cdot \{(x_0-\eta_0)\cdot(x_1-\eta_1)\cdot(x_2-\eta_2)\}+\tau_1 \cdot (x_3-=\eta_3)+\tau_2 \cdot (x_4-=\eta_4)$$

Relationship Between Polynomial and Inner Product

The polynomial $f(x_0, \ldots, x_{H-1})$ indicating a logical expression can be expressed by the inner product of two n-dimensional vectors. More specifically, a vector having the indeterminate elements of the terms of the polynomial $f(x_0, \ldots, x_{H-1})$ as elements, $$\vec{v}=(v_1, \ldots, v_n)$$

and a vector having the coefficients of the terms of the polynomial $f(x_0, \ldots, x_{H-1})$ as elements, $$\vec{w}=(w_1, \ldots, w_n)$$

are used to generate the inner product thereof, $$f(x_0, \ldots, x_{H-1})=\vec{w}\cdot\vec{v}$$

which is equal to the polynomial $f(x_0, \ldots, x_{H-1})$. In other words, whether the polynomial $f(x_0, \ldots, x_{H-1})$ indicating a logical expression is zero is equivalent to whether the inner product of the vector $\vec{v}$ having the indeterminate elements of the terms of the polynomial $f(x_0, \ldots, x_{H-1})$ as elements and the vector $\vec{w}$ having the coefficients of the terms of the polynomial $f(x_0, \ldots, x_{H-1})$ as elements is zero.

$$f(x_0, \ldots, x_{H-1})=0 \longleftrightarrow \vec{w}\cdot\vec{v}=0$$

For example, a polynomial $f(x)=\theta_0 \cdot x^0+\theta_1 \cdot x+ \ldots + \theta_{n-1}\cdot x^{n-1}$ expressed with one indeterminate element x can be expressed with two n-dimensional vectors $$\vec{w}=(w_1, \ldots, w_n)=(\theta_0, \ldots, \theta_{n-1}) \tag{39}$$

$$\vec{v}=(v_1, \ldots, v_n)=(x^0, \ldots, x^{n-1}) \tag{40}$$

by the inner product thereof.

$$f(x)=\vec{w}\cdot\vec{v} \tag{41}$$

In other words, whether the polynomial f(x) indicating a logical expression is zero is equivalent to whether the inner product in Expression (41) is zero.

$$f(x)=0 \longleftrightarrow \vec{w}\cdot\vec{v}=0 \tag{42}$$

When a vector having the indeterminate elements of the terms of the polynomial $f(x_0, \ldots, x_{H-1})$ as elements is expressed by $$\vec{w} = (w_1, \ldots, w_n)$$

and a vector having the coefficients of the terms of the polynomial $f(x_0, \ldots, x_{H-1})$ as elements is expressed by $$\vec{v} = (v_1, \ldots, v_n)$$

whether the polynomial $f(x_0, \ldots, x_{H-1})$ indicating a logical expression is zero is equivalent to whether the inner product of the vector $\vec{w}$ and the vector $\vec{v}$ is zero.

For example, when the following expressions are used instead of Expressions (39) and (40), $$\vec{w} = (w_1, \ldots, w_n) = (x^0, \ldots, x^{n-1}) \quad (43)$$

$$\vec{v} = (v_1, \ldots, v_n) = (\theta_0, \ldots, \theta_{n-1}) \quad (44)$$

whether the polynomial $f(x)$ indicating a logical expression is zero is equivalent to whether the inner product in Expression (41) is zero.

In inner product predicate encryption, one of the vectors $\vec{v} = (v_0, \ldots, v_{n-1})$ and $\vec{w} = (w_0, \ldots, w_{n-1})$ is used as attribute information and the other is used as predicate information. One of the attribute information and predicate information is embedded in ciphertext and the other is embedded in key information. For example, an n-dimensional vector $(\theta_0, \ldots, \theta_{n-1})$ is used as predicate information, another n-dimensional vector $(x^0, \ldots, x^{n-1})$ is used as attribute information, one of the attribute information and predicate information is embedded in ciphertext, and the other is embedded in key information. It is assumed in the following description that an n-dimensional vector embedded in key information is $\vec{w} = (w_1, \ldots, w_n)$ and another n-dimensional vector embedded in ciphertext is $\vec{v} = (v_1, \ldots, v_n)$.

For example,
Predicate information: $\vec{w} = (w_1, \ldots, w_n) = (\theta_0, \ldots, \theta_{n-1})$
Attribute information: $\vec{v} = (v_1, \ldots, v_n) = (x^0, \ldots, x^{n-1})$
Alternatively,
Predicate information: $\vec{v} = (v_1, \ldots, v_n) = (\theta_0, \ldots, \theta_{n-1})$
Attribute information: $\vec{w} = (w_1, \ldots, w_n) = (x^0, \ldots, x^{n-1})$ Basic Configuration of Inner Product Predicate Encryption An example basic configuration of a key encapsulation mechanism (KEM) using inner product predicate encryption will be described below. This configuration includes Setup($1^k$), GenKey(MSK, $\vec{w}$), Enc(PA, $\vec{v}$), and Dec(SKw, $C_2$).

Setting up Setup($1^k$)
Input: Security parameter k
Output: Master key information MSK, public parameter PK In an example of Setup($1^k$), a security parameter k is used as n, and an (n+1) row by (n+1) column matrix A having (n+1)-dimensional basis vectors $a_i$ (i=1, ..., n+1) as elements, an (n+1) row by (n+1) column matrix A* having basis vectors $a_i^*$ (i=1, ..., n+1) as elements, and (n+1) row by (n+1) column matrixes X and X* used for coordinate conversion are selected. Then, (n+1)-dimensional basis vectors $b_i$ (i=1, ..., n+1) are calculated through coordinate conversion by Expression (22), and (n+1)-dimensional basis vectors $b_i^*$ (i=1, ..., n+1) are calculated through coordinate conversion by Expression (24). Then, an (n+1) row by (n+1) column matrix B* having the basis vectors $b_i^*$ (i=1, ..., n+1) as elements is output as master key information MSK; and vector spaces V and V*, an (n+1) row by (n+1) column matrix B having the basis vectors $b_i$ (i=1, ..., n+1) as elements, the security parameter k, a finite field $F_q$, an elliptic curve E, cyclic groups $G_1$, $G_2$, and $G_T$, generators $g_1$, $g_2$, and $g_T$, a bilinear function e, and others are output as a public parameter PK.

Key Information Generation GenKey(MSK, $\vec{w}$)
Input: Master key information MSK, vector $\vec{w}$
Output: Key information D* corresponding to vector $\vec{w}$ In an example of GenKey(MSK, $\vec{w}$), an element $\alpha \in F_q$ is selected from the finite field $F_q$. Then, the matrix B*, which is the master key information MSK, is used to generate and output key information D* corresponding to the vector $\vec{w}$ in the following way.

$$D^* = \alpha \cdot (\Sigma_{\mu=1}^n w_\mu \cdot b_\mu^*) + b_{n+1}^* \in G_2^{n+1} \quad (45)$$

If it is difficult to solve a discrete logarithmic problem on the cyclic group $G_2$, it is difficult to separate and extract the components of $w_\mu \cdot b_\mu^*$ and $b_{n+1}^*$ from the key information D*.

Encryption Enc(PA, $\vec{v}$)
Input: Public parameter PK, vector $\vec{v}$
Output: Ciphertext $C_2$, common key K In an example of Enc(PA, $\vec{v}$), a common key K and a random number $\upsilon_1$, which is an element of the finite field $F_q$, are generated. Then, the public parameter PK, such as the matrix B, an element $\upsilon_2$ corresponding to a value that includes the common key K, in the finite field $F_q$, the vector $\vec{v}$, and the random number $\upsilon_1$ are used to generate ciphertext $C_2$ in the following way.

$$C_2 = \upsilon_1 \cdot (\Sigma_{\mu=1}^n v_\mu \cdot b_\mu) + \upsilon_2 \cdot b_{n+1} \in G_1^{n+1} \quad (46)$$

The ciphertext $C_2$ and the common key K are output. An example of the common key K is $g_T^{\tau \cdot \upsilon_2} \in G_T$, where $\upsilon_2$ means $\upsilon_2$. An example of $\tau$ is $1_F$, as described above. If it is difficult to solve a discrete logarithmic problem on the cyclic group $G_1$, it is difficult to separate and extract the components of $v_\mu \cdot b_\mu$ and $\upsilon_2 \cdot b_{n+1}$ from the ciphertext $C_2$.

Decryption and Key Sharing Dec(SKw, $C_2$)
Input: Key information $D_1^*$ corresponding to vector $\vec{w}$, ciphertext $C_2$
Output: Common key K In an example of Dec(SKw, $C_2$), the ciphertext $C_2$ and the key information $D_1^*$ are input to the bilinear function e of Expression (2). Then, from the characteristics of Expressions (3) and (26), the following is satisfied.

$$\begin{aligned}
e(C_2, D^*) &= e\left(\upsilon_1 \cdot \left(\sum_{\mu=1}^n v_\mu \cdot b_\mu\right) + \upsilon_2 \cdot b_{n+1}, \alpha \cdot \left(\sum_{\mu=1}^n w_\mu \cdot b_\mu^*\right) + b_{n+1}^*\right) \\
&= e(\upsilon_1 \cdot v_1 \cdot b_1, \alpha \cdot w_1 \cdot b_1^*) \cdot \ldots \cdot e(\upsilon_1 \cdot v_n \cdot b_n, \alpha \cdot w_n \cdot b_n^*) \times \\
&\quad e(\upsilon_2 \cdot b_{n+1}, b_{n+1}^*) \\
&= e(b_1, b_1^*)^{\upsilon_1 \cdot v_1 \cdot \alpha \cdot w_1} \cdot \ldots \cdot e(b_n, b_n^*)^{\upsilon_1 \cdot v_n \cdot \alpha \cdot w_n} \cdot e(b_{n+1}, b_{n+1}^*)^{\upsilon_2} \\
&= g_T^{\tau \cdot \upsilon_1 \cdot v_1 \cdot \alpha \cdot w_1} \cdot \ldots \cdot g_T^{\tau \cdot \upsilon_1 \cdot v_n \cdot \alpha \cdot w_n} \cdot g_T^{\tau \cdot \upsilon_2} \\
&= g_T^{\tau \cdot \upsilon_1 \cdot \alpha \cdot \vec{v} \cdot \vec{w}} \cdot g_T^{\tau \cdot \upsilon_2}
\end{aligned} \quad (47)$$

When the inner product $\vec{w} \cdot \vec{v}$ is zero, Expression (47) can be changed to the following.

$$\begin{aligned}
e(C_2, D^*) &= g_T^{\tau \cdot \upsilon_1 \cdot \alpha \cdot 0} \cdot g_T^{\tau \cdot \upsilon_2} \\
&= g_T^{\tau \cdot \upsilon_2}
\end{aligned} \quad (48)$$

From this result, the common key K is generated and output. An example of the common key K is $g_T^{\tau \cdot \upsilon_2} \in G_T$.

First Embodiment

An information generation apparatus and method according to a first embodiment implement hierarchical cryptography by using the predicate encryption described above. More specifically, they employ the basis b* used in the predicate encryption described above to implement information derivation expressed in general semiordered structures other than tree structures.

FIG. 1 is an example of a functional block diagram of the information generation apparatus according to the first embodiment.

Each piece of information is assigned an index $v=(v_1, \ldots, v_{N-1}) \in I = (F_q \cup \{*\})^{N-1}$, and a set $w(v)=\{i | v_i = *\}$ corresponding to the index v is defined, where * indicates an indeterminate character. Indexes that will be described below, such as an index u and an index Y, have the same structure as the index v: $u=(u_1, \ldots, u_{N-1}) \in I = (F_q \cup \{*\})^{N-1}$ and $Y=(Y_1, \ldots, Y_{N-1}) \in I = (F_q \cup \{*\})^{N-1}$. When $w(u) \subset w(v)$ and $v_i = u_i$ ($i \in \{1, \ldots, N-1\} \setminus w(v)$) for the index $u \in I$ and the index $v \in I$, in other words, when $w(u) \subset w(v)$ and $v_i = u_i$ for any $i \in \{1, \ldots, N-1\} \setminus w(v)$, the index u≤the index v and the index v is higher information than the index u, where the symbol \ indicates the subtraction of set and, for example, $A \setminus B = \{2, 3\}$ when set $A=\{1, 2, 3\}$ and set $B=\{1\}$.

When the index $v=\{v_1, v_2, v_3\}=\{2, *, *\}$ and the index $u=\{u_1, u_2, u_3\}=\{2, *, 4\}$, for example, $w(v)=\{2, 3\}$ and $w(u)=\{2\}$ and $w(u) \subset w(v)$ is satisfied. Here, $v_1=u_1=2$. Therefore, the index u≤the index v and the index v is higher information than the index u In the following description, the index Y corresponds to information generated from the basis $b_i^*$, the index v corresponds to information of a derivation base, and the index u corresponds to information derived from information of the derivation base.

Information Generation

Figure 2:
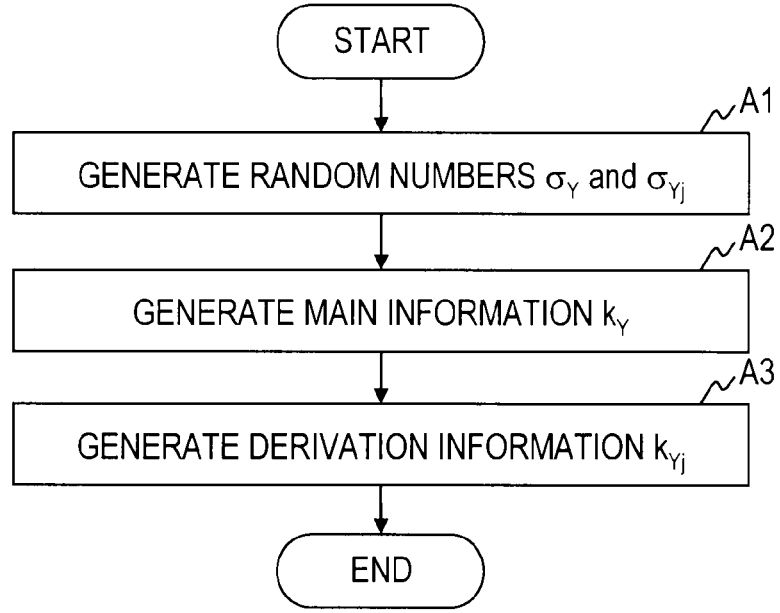
FIG. 2 is an example flowchart of information generation in the first embodiment.

The information generation apparatus and method generate information $K_Y$ corresponding to the index Y by using the basis $b_i^*$ in Step A1 to Step A3 in FIG. 2. The information $K_Y$ includes main information $k_Y$ and derivation information $k_{Yj}$. The main information $k_Y$ is used as a decryption key, for example, in predicate encryption. The derivation information $k_{Yj}$ is used to generate information lower than the information $K_Y$ corresponding to the index Y.

The information generation apparatus receives the index $Y \in I$.

A random number generator 1 generates a random number $\sigma_Y \in Z_q$ and a random number $\sigma_{Yj} \in Z_q$ corresponding to each element $j \in w(Y)$ of a set $w(Y)$ (in step A1). The generated random number $\sigma_Y$ is sent to a main information generator 2. The generated random number $\sigma_{Yj}$ is sent to a derivation information generator 3. When the set $w(Y)=\{2, 3\}$, for example, the random number generator 1 generates $\sigma_Y$, $\sigma_{Y2}$, and $\sigma_{Y3}$.

The main information generator 2 uses the generated random number $\sigma_Y$ to calculate main information $k_Y$ that satisfies $k_Y = \sigma_Y \Sigma_{i \in \{1, \ldots, N-1\} \setminus w(Y)} Y_i b_i^* + b_N^*$ (in step A2). The calculated main information $k_Y$ is stored in a storage 4.

The derivation information generator 3 uses the generated random number $\sigma_{Yj}$ to calculate derivation information $k_{Yj}$ that satisfies $k_{Yj} = \sigma_{Yj} \Sigma_{i \in \{1, \ldots, N-1\} \setminus w(Y)} Y_i b_i^* + b_j^*$ for each element $j \in w(Y)$ of the set $w(Y)$ (in step A3). The calculated derivation information $k_{Yj}$ is stored in the storage 4.

Information Derivation

Figure 3:
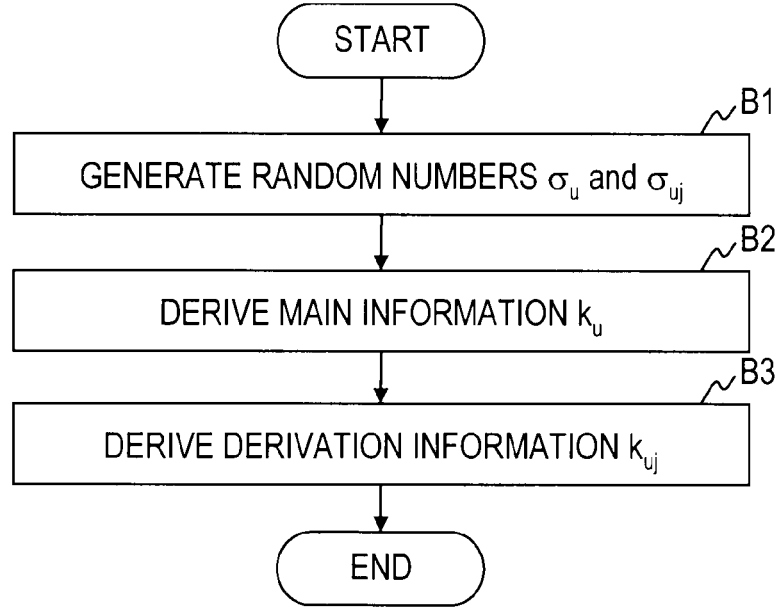
FIG. 3 is an example flowchart of information derivation in the first embodiment.

The information generation apparatus and method generate information $K_u$ corresponding to a lower index u from information $K_v$ corresponding to an upper index v, where u≤v, in step B1 to step B3 shown in FIG. 3.

The information $K_v$ corresponding to the index v includes main information $k_v$ and derivation information $k_{vj}$. The main information $k_v$ is used as a decryption key, for example, in predicate encryption. The derivation information $k_{vj}$ is used to generate information lower than the information $K_v$ corresponding to the index v. For example, the index v=Y and the information $K_v = K_Y$. The information $K_u$ generated in the processing of steps B1 to B3 may be regarded as new information $K_v$ to generate information $K_{u'}$ (u'≤u) lower than the information $K_u$ corresponding to the index u.

The information $K_u$ corresponding to the index u includes main information $k_u$ and derivation information $k_{uj}$. The main information $k_u$ is used as a decryption key, for example, in predicate encryption. The derivation information $k_{uj}$ is used to generate information lower than the information $K_u$ corresponding to the index u.

The information generation apparatus receives the index v and the index u.

It is assumed that the storage 4 has stored the information $K_v$ corresponding to the index v.

The random number generator 1 generates a random number $\sigma_u \in Z_q$ and a random number $\sigma_{uj} \in Z_q$ corresponding to each element $j \in w(u)$ of a set $w(u)$ (in step B1). The generated random number $\sigma_u$ is sent to a main information deriving unit 5. The generated random number $\sigma_{uj}$ is sent to a derivation information deriving unit 6.

The main information deriving unit 5 uses the main information $k_v$ and the derivation information $k_{vi}$, both of which are read from the storage 4, and the generated random number $\sigma_u$ to calculate main information $k_u$ corresponding to the index u, that satisfies $k_u = \sigma_u \Sigma_{i \in w(v) \setminus w(u)} u_i k_{vi} + k_v$ (in step B2). The calculated main information $k_u$ is stored in the storage 4.

The derivation information deriving unit 6 uses the derivation information $k_{vj}$ read from the storage 4 and the generated random number $\sigma_{uj}$ to calculate derivation information $k_{uj}$ that satisfies $k_{uj} = \sigma_{uj} \Sigma_{i \in w(v) \setminus w(u)} u_i k_{vi} + k_{vj}$ for each element $j \in w(u)$ of the set $w(u)$ (in step B3). The calculated derivation information $k_{uj}$ is stored in the storage 4.

As described above, the information $K_Y$ corresponding to the index Y is generated and information corresponding to a lower index is derived from the information $K_Y$. This means that, for a parent node A and a parent node B both having a common child node C, information of the common child node C can be derived from information of the parent node A and information of the common child node C can be derived from information of the parent node B.

Specific Case 1

A case will be described below in which information of each node serves as a key in predicate encryption and information of an index $v^3$, generated from information of an index $v^1$ matches information of the index $v^3$, generated from information of an index $v^2$ in terms of a key in predicate encryption. The indexes $v^1$, $v^2$, and $v^3$, described below, are examples, and the same things can apply to the other indexes.

It is assumed that the index $v^1 = \{v_1, v_2, *, *\}$, the index $v^2 = \{*, *, v_3, v_4\}$, and the index $v^3 = \{v_1, v_2, v_3, v_4\}$. From the definition, $v^1 \geq v^3$ and $v^2 \geq v^3$ and the index $v^1$, serving as a parent node, and the index $v^2$, serving as a parent node, have the index $v^3$ as a common child node. In the following description, $v^i$ (i=1, 2, 3) may be indicated by v^i, and the j-th element of the index $v^i$ may be indicated by v^ij.

N is set to 5, and information $K_{v^1}$ corresponding to the index $v^1$ and information $K_{v^3}'$ corresponding to the index $v^2$ are generated from N bases $b_1^*$, $b_2^*$, $b_3^*$, $b_4^*$, and $b_5^*$.

Random numbers $\sigma_{v^\wedge 1}$, $\sigma_{v^\wedge 13}$, $\sigma_{v^\wedge 14}$, $\sigma_{v^\wedge 2}$, $\sigma_{v^\wedge 23}$, $\sigma_{v^\wedge 24}$, $\sigma_{v^\wedge 3}$, and $\sigma_{v^\wedge 3}'$ are generated by the random number generator 1.

The information $K_{v^\wedge 1}$ (main information $k_{v^\wedge 1}$ and derivation information $k_{v^\wedge 3}$ and $k_{v^\wedge 4}$) corresponding to the index $v^1$ is as described below.

$$k_{v^\wedge 1} = \sigma_{v^\wedge 1}(v_1 b_1^* + v_2 b_2^*) + b_{5*}$$

$$k_{v^\wedge 13} = \sigma_{v^\wedge 13}(v_1 b_1^* + v_2 b_2^*) + b_3^*$$

$$k_{v^\wedge 14} = \sigma_{v^\wedge 14}(v_1 b_1^* + v_2 b_2^*) + b_4^*$$

The information $K_{v^\wedge 2}$ (main information $k_{v^\wedge 2}$ and derivation information $k_{v^\wedge 21}$ and $k_{v^\wedge 22}$) corresponding to the index $v^2$ is as described below.

$$k_{v^\wedge 2} = \sigma_{v^\wedge 2}(v_3 b_3^* + v_4 b_4^*) + b_5^*$$

$$k_{v^\wedge 21} = \sigma_{v^\wedge 23}(v_3 b_3^* + v_4 b_4^*) + b_1^*$$

$$k_{v^\wedge 22} = \sigma_{v^\wedge 24}(v_3 b_3^* + v_4 b_4^*) + b_2^*$$

The main information $k_{v^\wedge 3}$ corresponding to the index $v^3$ is derived from the information $K_{v^\wedge 1}$ corresponding to the index $v^1$ as described below.

$$\begin{aligned} k_{v^\wedge 3} &= \sigma_{v^\wedge 3}(v_3 k_{v^\wedge 13} + v_4 k_{v^\wedge 1}) + k_{v^\wedge 1} \quad (A) \\ &= \sigma_{v^\wedge 3}(v_3 \sigma_{v^\wedge 13} + v_4 \sigma_{v^\wedge 14}) + \sigma_{v^\wedge 1})(v_1 b_1^* + v_2 b_2^*) + \\ &\quad \sigma_{v^\wedge 3}(v_3 b_3^* + v_4 b_4^*) + b_5^* \\ &= a(v_1 b_1^* + v_2 b_2^*) + b(v_3 b_3^* + v_4 b_4^*) + b_5^* \end{aligned}$$

where $a = (\sigma_{v^\wedge 3}(v_3 \sigma_{v^\wedge 13} + v_4 \sigma_{v^\wedge 14}) + \sigma_{v^\wedge 1})$ and $b = \sigma_{v^\wedge 3}$.

Main information $k_{v^\wedge 3}$ corresponding to the index $v^3$ is derived from the information $K_{v^\wedge 2}$ corresponding to the index $v^2$ as described below.

$$\begin{aligned} k_{v^\wedge 3} &= \sigma'_{v^\wedge 3}(v_1 k_{v^\wedge 21} + v_{21} + v_2 k_{v^\wedge 22}) + k_{v^\wedge 2} \quad (B) \\ &= (\sigma'_{v^\wedge 3}(v_1 \sigma_{v^\wedge 23} + v_4 \sigma_{v^\wedge 24}) + \sigma_{v^\wedge 2})(v_3 b_3^* + v_4 b_4^*) + \\ &\quad \sigma'_{v^\wedge 3}(v_1 b_1^* + v_2 b_2) + b_5^* \\ &= c(v_1 b_1^* + v_2 b_2^*) + d(v_3 b_3^* + v_4 b_4^*) + b_5^* \end{aligned}$$

where $c = \sigma_{v^\wedge 3}'$ and $d = (\sigma_{v^\wedge 3}'(v_1 \sigma_{v^\wedge 23} + v_4 \sigma_{v^\wedge 24}) + \sigma_{v^\wedge 2})$.

The main information $k_{v^\wedge 3}$ derived from the information $K_{v^\wedge 1}$, shown in Expression (A), and the main information $k_{v^\wedge 3}$ derived from the information $K_{v^\wedge 2}$, shown in Expression (B), are not equal in value but are a same-value key in predicate encryption. More specifically, when $(v_1 b_1^* + v_2 b_2^*)$ is regarded as the inner product of a vector $(b_1^*, b_2^*)$ and a vector $(v_1, v_2)$, the direction of the vector $(v_1, v_2)$ with respect to the vector $(b_1^*, b_2^*)$ is the same in both Expressions (A) and (B); when $(v_3 b_3^* + v_4 b_4^*)$ is regarded as the inner product of a vector $(b_3^*, b_4^*)$ and a vector $(v_3, v_4)$, the direction of the vector $(v_3, v_4)$ with respect to the vector $(b_3^*, b_4^*)$ is the same in both Expressions (A) and (B). This means that both keys are a same-value key in predicate encryption.

Second Embodiment

Figure 4:
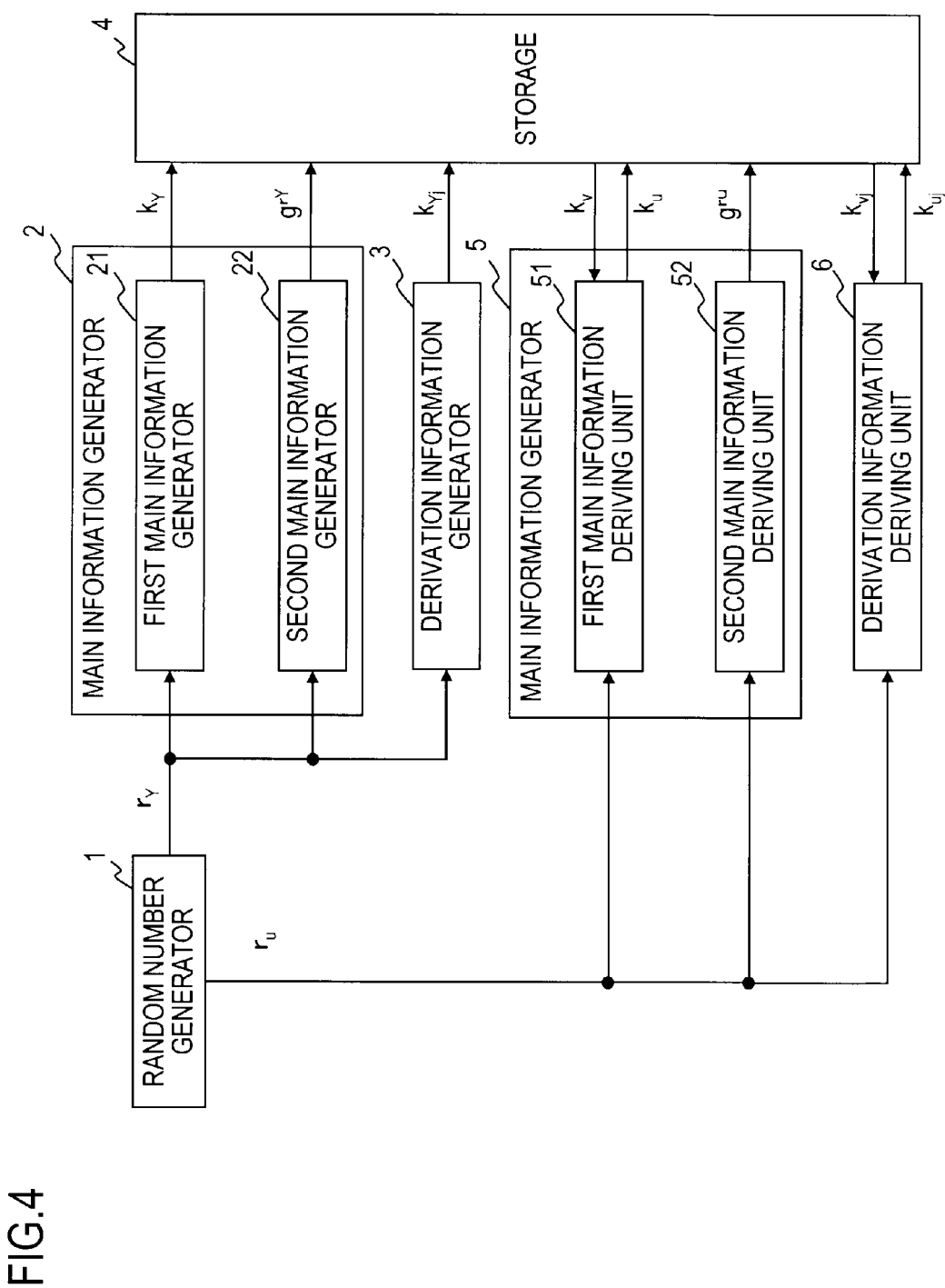
FIG. 4 is an example functional block diagram of an information generation apparatus according to a second embodiment.

FIG. 4 is an example functional block diagram of an information generation apparatus according to a second embodiment.

It is assumed that cyclic groups G and $G_T$ has a prime number order q; the cyclic group G has a generator g; the cyclic group G has a pairing function $e: G \times G \rightarrow G_T$, which makes $g_T = e(g, g)$ a generator of the cyclic group $G_T$; a random number a is selected from $Z_p$ at random; and $g$, $g_1 = g^a \in G$, and $g_2, g_3, h_1, \ldots, h_{N-1} \in G$ randomly selected from the cyclic group G are made publicly available as public keys.

Information Generation

Figure 5:
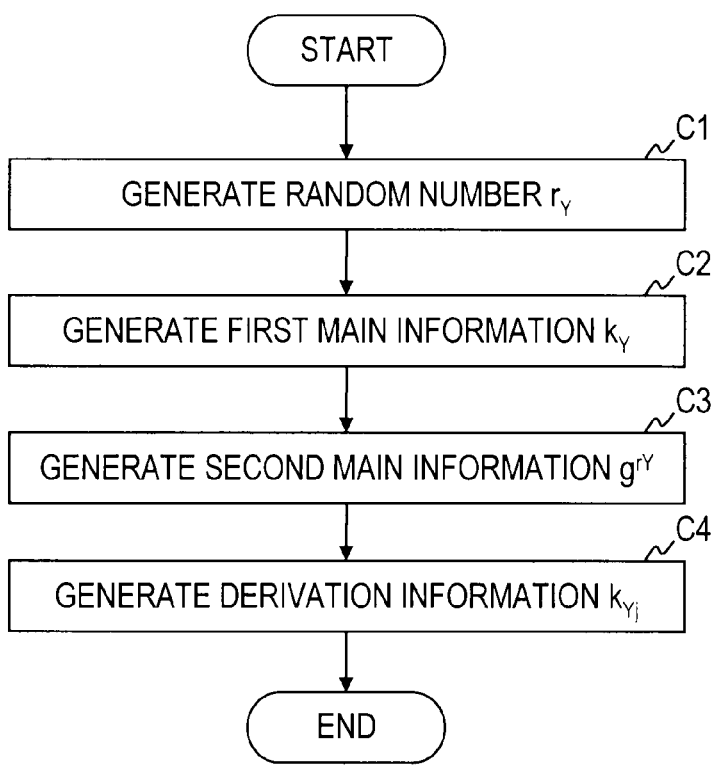
FIG. 5 is an example flowchart of information generation in the second embodiment.

The information generation apparatus and an information generation method generate information $K_Y$ corresponding to an index Y by using the public keys in step C1 to step C4 in FIG. 5. The information $K_Y$ includes first main information $k_Y$, second main information $g^{rY}$, and derivation information $k_{yj}$. The first main information $k_Y$ and the second main information $g^{rY}$ are used, for example, as decryption keys. The derivation information $k_{Yj}$ is used to generate information lower than the information $K_Y$ corresponding to the index Y.

The information generation apparatus receives the index $Y \in I$.

A random number generator 1 generates a random number $r_Y \in Z_q$ (in step C1). The generated random number $r_Y$ is sent to a first main information generator 21, a second main information generator 22, and a derivation information generator 3.

The first main information generator 21 uses the generated random number $r_Y$ to calculate first main information $k_Y$ that satisfies $k_Y = g_2{}^a (g_3 \Pi_{i \in \{1, \ldots, N-1\} \setminus w(Y)} h_i^{H_i})^{r_Y}$ (in step C2). The calculated first main information $k_Y$ is stored in a storage 4.

The second main information generator 22 uses the generated random number $r_Y$ to calculate second main information $g^{rY}$ (in step C3). The calculated second main information $g^{rY}$ is stored in the storage 4.

The derivation information generator 3 uses the generated random number $r_Y$ to calculate derivation information $k_{Yj}$ that satisfies $k_{Yj} = h_j{}^{rY}$ for each element $j \in w(Y)$ of a set $w(Y)$ (in step C4). The calculated derivation information $k_{Yj}$ is stored in the storage 4.

Information Derivation

Figure 6:
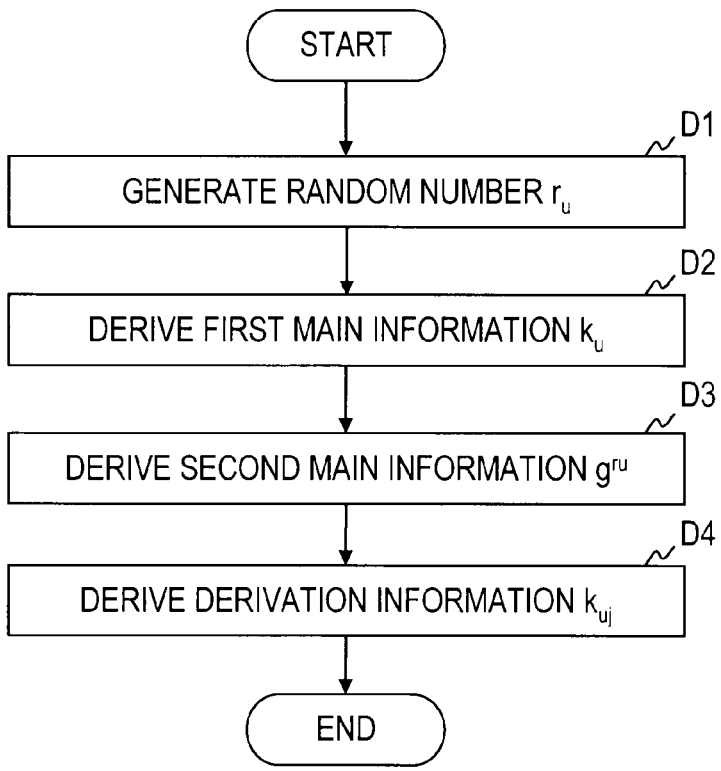
FIG. 6 is an example flowchart of information derivation in the second embodiment.

The information generation apparatus and method generate information $K_u$ corresponding to a lower index u from information $K_v$ corresponding to an upper index v, where $u \leq v$, in step D1 to step D4 shown in FIG. 6.

The information $K_v$ corresponding to the index v includes first main information $k_v$, second main information $g^{rv}$, and derivation information $k_{vj}$. The first main information $k_v$ and the second main information $g^{rv}$ are used, for example, as decryption keys. The derivation information $k_{vj}$ is used to generate information lower than the information $K_v$ corresponding to the index v. For example, the index v=Y and the information $K_v = K_Y$. The information $K_u$ generated in the processing of steps D1 to D4 may be regarded as new information $K_v$ to generate information $K_{u'}$ ($u' \leq u$) lower than the information $K_u$ corresponding to the index u.

The information $K_u$ corresponding to the index u includes first main information $k_u$, second main information $g^{ru}$, and derivation information $k_{uj}$. The first main information $k_u$ and the second main information $g^{ru}$ are used, for example, as decryption keys. The derivation information $k_{uj}$ is used to generate information lower than the information $K_u$ corresponding to the index u.

The information generation apparatus receives the index v and the index u.

It is assumed that the storage 4 has stored the information $K_v$ corresponding to the index v.

The random number generator 1 generates a random number $r_u$ (in step D1). The generated random number is sent to a first main information deriving unit 51, a second main information deriving unit 52, and a derivation information deriving unit 6.

The first main information deriving unit 51 uses the first main information $k_v$ and the derivation information $k_{vi}$, both of which are read from the storage 4, and the generated random number $r_u$ to calculate first main information $k_u$ corresponding to the index u, that satisfies $k_u = k_v (\Pi_{i \in w(v) \setminus w(u)} k_{vi}^{ui})(g_3 \Pi_{i \in \{1, \ldots, N-1\} \setminus w(v)} h_i^{vi} \Pi_{i \in w(v) \setminus w(u)} h_i^{ui})^{r_u}$ (in step D2). The calculated first main information $k_u$ is stored in the storage 4.

The second main information deriving unit 52 uses the generated random number $r_u$ to calculate second main information $g^{r_u}$ (in step D3). The calculated second main information $g^{r_u}$ is stored in the storage 4.

The derivation information deriving unit 6 uses the derivation information $k_{vi}$ read from the storage and the generated random number $r_u$ to calculate derivation information $k_{uj}$ that satisfies $k_{uj} = k_{vj} h_j^{r_u}$ for each element $j \in w(u)$ of a set $w(u)$ (in step D4). The calculated derivation information $k_{uj}$ is stored in the storage 4.

As described above, the information $K_Y$ corresponding to the index Y is generated and information corresponding to a lower index is derived from the information $K_Y$. This means that, for a parent node A and a parent node B both having a common child node C, information of the common child node C can be derived from information of the parent node A and information of the common child node C can be derived from information of the parent node B.

Specific Case 2

A case will be described below in which information of each node serves as a key in predicate encryption and information of an index $v^3$, generated from information of an index $v^1$ matches information of the index $v^3$, generated from information of an index $v^2$ in terms of a key in predicate encryption. The indexes $v^1$, $v^2$, and $v^3$, described below, are examples, and the same things can apply to the other indexes.

It is assumed that the index $v^1 = \{v_1, v_2, *, *\}$, the index $v^2 = \{*, *, v_3, v_4\}$, and the index $v^3 = \{v_1, v_2, v_3, v_4\}$. From the definition, $v^1 \geq v^3$ and $v^2 \geq v^3$ and the index $v^1$, serving as a parent node, and the index $v^2$, serving as a parent node, have the index $v^3$ as a common child node. In the following description, $v^i$ (i=1, 2, 3) may be indicated by v^i, and the j-th element of the index $v^i$ may be indicated by v^ij.

It is assumed that N is set to 5 and $g_1 = g^a$, $g^a$, $g_3$, $h_1$, $h_2$, $h_3$, $h_4 \in G$ are made publicly available as public keys. From these public keys, information $K_{v^1}$ corresponding to the index $v^1$ and information $K_{v^2}$ corresponding to the index $v^2$ are generated. Random numbers $r_{v^1}$ and $r_{v^2}$ are generated by the random number generator 1.

The information $K_{v^1}$ (first main information $k_{v^1}$, second main information $g^{r_{v^1}}$, and derivation information $k_{v^13}$ and $k_{v^14}$) corresponding to the index $v^1$ is as described below.

$$k_{v^1} = g_2^a (g_3 h_1^{v1} h_2^{v2})^{r_{v^1}}$$

$$g^{r_{v^1}}$$

$$k_{v^13} = h_3^{r_{v^1}}$$

$$k_{v^14} = h_4^{r_{v^1}}$$

The information $K_{v^2}$ (first main information $k_{v^2}$, second derivation information $g^{r_{v^2}}$, and derivation information $k_{v^21}$ and $k_{v^22}$) corresponding to the index $v^2$ is as described below.

$$k_{v^2} = g_2^a (g_3 h_3^{v3} h_4^{v4})^{r_{v^2}}$$

$$g^{r_{v^2}}$$

$$k_{v^21} = h_1^{r_{v^2}}$$

$$k_{v^22} = h_2^{r_{v^2}}$$

First main information $k_{v^3}$ corresponding to the index $v^3$ is derived from the information $K_{v^1}$ corresponding to the index $v^1$ as described below.

$$k_{v^3} = k_{v^1} (k_{v^13}^{v3} k_{v^14}^{v4}) (g_3 h_1^{v1} h_2^{v2} h_3^{v3} h_4^{v4})^{r_{v^3}} \quad (C)$$

$$= g_2^a (g_3 h_1^{v1} h_2^{v2} h_3^{v3} h_4^{v4})^{r}$$

where $r_{v^3}$ is a random number generated by the random number generator 1, and $r = r_{v^1} + r_{v^3}$.

First main information $k_{v^3}$ corresponding to the index $v^3$ is derived from the information $K_{v^2}$ corresponding to the index $v^2$ as described below.

$$k_{v^3} = k_{v^1} (k_{v^13}^{v3} k_{v^14}^{v4}) (g_3 h_1^{v1} h_2^{v2} h_3^{v3} h_4^{v4})^{r_{v^3}} \quad (D)$$

$$= g_2^a (g_3 h_1^{v1} h_2^{v2} h_3^{v3} h_4^{v4})^{r}$$

where $r_{v^3'}$ is a random number and $r' = r_{v^2} + r_{v^3'}$.

The first main information $k_{v^3}$ derived from the information $K_{v^1}$, shown in Expression (C), and the second main information $g^{r_{v^3}}$, and the first main information $k_{v^3}$ derived from the information $K_{v^2}$, shown in Expression (D), and the second main information $g^{r_{v^3'}}$ are not equal in value but are a same-value key in predicate encryption because the ratios of the exponents of the public keys $g_3$, $h_1$, $h_2$, $h_3$, and $h_4$ are equal.

Modifications and Others

In each of the above described embodiments, the information generation apparatus includes all of the main information generator 2, the derivation information generator 3, the main information deriving unit 5, and the derivation information deriving unit 6, but the information generation apparatus needs to have at least one of them. For example, the information generation apparatus may have only the main information generator 2 and the derivation information generator 3. Alternatively, the information generation apparatus may have only the main information deriving unit 5 and the derivation information deriving unit 6, and may use the information $K_v$ already generated and stored in the storage 4 to generate the information $K_u$.

Each operation defined on the finite field $F_q$ may be replaced with an operation defined on a finite ring $Z_q$ of order q. An example of replacing each operation defined on the finite field $F_q$ with an operation defined on the finite ring $Z_q$ is a method of permitting q other than a prime number or a power thereof.

Each of the information generation apparatuses described above can be implemented by a computer. In that case, the processing details of the functions that should be provided by the apparatus are described in a program. When the program is executed by a computer, the processing functions of the apparatus are implemented on the computer.

The information generation program containing the processing details can be recorded in a computer-readable recording medium. The information generation apparatus is configured when the program is executed by a computer. At least a part of the processing details may be implemented by hardware.

The present invention is not limited to the above described embodiments. Any modifications are possible within the scope of the present invention.

What is claimed is:

1. An information generation apparatus comprising:
   a processor;
   a random number generator, implemented by the processor, adapted to generate a random number $\sigma_Y \in Z_q$ and a random number $\sigma_{Yj} \in Z_q$ corresponding to each element $j \in w(Y)$ of a set $w(Y)$;
   a main information generator, implemented by the processor, adapted to use the generated random number $\sigma_Y$ to calculate main information $k_Y$ that satisfies $k_Y = \sigma_Y \Sigma_{i \in \{1, \ldots, N-1\} \backslash w(Y)} Y_i b_i^* + b_N^*$; and
   a derivation information generator, implemented by the processor, adapted to use the generated random number $\sigma_{Yj}$ to calculate derivation information $k_{Yj}$ that satisfies $k_{Yj} = \sigma_{Yj} \Sigma_{i \in \{1, \ldots, N-1\} \backslash w(Y)} Y_i b_i^* + b_j^*$ for each element $j \in w(Y)$ of the set $w(Y)$;
   where e is a non-degenerate, bilinear function that outputs one element of a cyclic group $G_T$ in response to inputs of N elements $\gamma_L$ (L=1, ..., N) (N≥2) of a cyclic group $G_1$ and N elements $\gamma_L^*$ (L=1, ..., N) of a cyclic group $G_2$; $b_i \in G_1^N$ (i=1, ..., N) is an N-dimensional basis vector having N elements of the cyclic group $G_1$ as elements; $b_j^* \in G_2^N$ (j=1, ..., N) is an N-dimensional basis vector having N elements of the cyclic group $G_2$ as elements; a function value obtained when each element of the basis vector $b_i \in G_1^N$ (i=1, ..., N) and each element of the basis vector $b_j^* \in G_2^N$ (j=1, ..., N) are put into the bilinear function e is represented by $g_T^{\tau \cdot \delta(i,j)} \in G_T$, using a Kronecker's delta function in which $\delta(i,j) = 1_F$ when i=j and $\delta(i,j) = 0_F$ when i≠j; $0_F$ is an additive unit element of a finite field $F_q$; $1_F$ is a multiplicative unit element of the finite field $F_q$; $\tau$ is an element of the finite field $F_q$, other than $0_F$; and $g_T$ is a generator of the cyclic group $G_T$; and
   * indicates an indeterminate character, an index Y is $Y = (Y_1, \ldots, Y_{N-1}) \in I = (F_q \cup \{*\})^{N-1}$, the set $w(Y)$ corresponds to the index Y, and $w(Y) = \{i | Y_i = *\}$.

2. The information generation apparatus according to claim 1,
   wherein the random number generator further generates a random number $\sigma_u \in Z_q$,
   the information generation apparatus comprising:
   a storage device adapted to store main information $k_v$ corresponding to an index v and derivation information $k_{vj}$ corresponding to the index v; and
   a main information deriving unit, implemented by the processor, adapted to use the main information $k_v$ and derivation information $k_{vj}$, both of which are read from the storage device, and the generated random number $\sigma_u$ to calculate main information $k_u$ corresponding to an index u, which satisfies $k_u = \sigma_u \Sigma_{i \in w(v) \backslash w(u)} u_i k_{vi} + k_v$;
   where * indicates an indeterminate character; the index v is $v = (v_1, \ldots, v_{N-1}) \in I = (F_q \cup \{*\})^{N-1}$; $w(v)$ is a set corresponding to the index v and $w(v) = \{i | v_i = *\}$; the index u is $u = (u_1, \ldots, u_{N-1}) \in I = (F_q \cup \{*\})^{N-1}$; $w(u)$ is a set corresponding to the index u and $w(u) = \{i | u_i = *\}$; $w(u) \subset w(v)$; and $v_i = u_i (i \in \{1, \ldots, N-1\} \backslash w(v))$.

3. The information generation apparatus according to claim 2, wherein the random number generator further generates a random number $\sigma_{uj} \in Z_q$, corresponding to each element $j \in w(u)$ of the set $w(u)$;
   the information generation apparatus further comprising:
   a derivation information deriving unit, implemented by the processor, adapted to use the derivation information $k_{vj}$ read from the storage device and the generated random number $\sigma_{uj}$ to calculate derivation information $k_{uj}$ corresponding to the index u, which satisfies $k_{uj} = \sigma_{uj} \Sigma_{i \in w(v) \backslash w(u)} u_i k_{vi} + k_{vj}$, for each element $j \in w(u)$ of the set $w(u)$.

4. An information generation apparatus comprising:
   a storage device adapted to store main information $k_v$ serving as main information $k_Y$ or corresponding to an index v, derived from the main information $k_Y$ and derivation information $k_{Yj}$, and derivation information $k_{vj}$ serving as the derivation information $k_{Yj}$ or corresponding to the index v, derived from the derivation information $k_{Yj}$;
   a processor;
   a random number generator, implemented by the processor, adapted to generate a random number $\sigma_u \in Z_q$; and
   a main information deriving unit, implemented by the processor, adapted to use the main information $k_v$ and derivation information $k_{vj}$, both of which are read from the storage unit, and the generated random number $\sigma_u$ to calculate main information $k_u$ corresponding to an index u, which satisfies $k_u = \sigma_u \Sigma_{i \in w(v) \backslash w(u)} u_i k_{vi} + k_v$;
   where e is a non-degenerate, bilinear function that outputs one element of a cyclic group $G_T$ in response to inputs of N elements $\gamma_L$ (L=1, ..., N) (N≥2) of a cyclic group $G_1$ and N elements $\gamma_L^*$ (L=1, ..., N) of a cyclic group $G_2$; $b_i \in G_1^N$ (i=1, ..., N) is an N-dimensional basis vector having N elements of the cyclic group $G_1$ as elements; $b_j^* \in G_2^N$ (j=1, ..., N) is an N-dimensional basis vector having N elements of the cyclic group $G_2$ as elements; a function value obtained when each element of the basis vector $b_i \in G_1^N$ (i=1, ..., N) and each element of the basis vector $b_j^* \in G_2^N$ (j=1, ..., N) are put into the bilinear function e is represented by $g_T^{\tau \cdot \delta(i,j)} \in G_T$, using a Kronecker's delta function in which $\delta(i,j) = 1_F$ when i=j and $\delta(i,j) = 0_F$ when i≠j; $0_F$ is an additive unit element of a finite field $F_q$; $1_F$ is a multiplicative unit element of the finite field $F_q$; $\tau$ is an element of the finite field $F_q$, other than $0_F$; and $g_T$ is a generator of the cyclic group $G_T$; and
   * indicates an indeterminate character; an index Y is $Y = (Y_1, \ldots, Y_{N-1}) \in I = (F_q \cup \{*\})^{N-1}$; a set $w(Y)$ corresponding to the index Y is $w(Y) = \{i | Y_i = *\}$; $\sigma_Y \in Z_q$ is a random number; $\sigma_{Yj} \in Z_q$ is a random number corresponding to each element $j \in w(Y)$ of the set $w(Y)$; the main information $k_Y$ corresponds to the index Y and satisfies $k_Y = \sigma_Y \Sigma_{i \in \{1, \ldots, N-1\} \backslash w(Y)} Y_i b_i^* + b_N^*$; and the derivation information $k_{Yj}$ corresponds to the index Y and satisfies $k_{Yj} = \sigma_{Yj} \Sigma_{i \in \{1, \ldots, N-1\} \backslash w(Y)} Y_i b_i^* b_j^*$;
   * indicates an indeterminate character; the index v is $v = (v_1, \ldots, v_{N-1}) \in I = (F_q \cup \{*\})^{N-1}$; the index u is $u = (u_1, \ldots, u_{N-1}) \in I = (F_q \cup \{*\})^{N-1}$; $w(v)$ is a set corresponding to the index v and $w(v) = \{i | v_i = *\}$; $w(u)$ is a set corresponding to the index u and $w(u) = \{i | u_i = *\}$; $w(u) \subset w(v)$; and $v_i = u_i (i \in \{1, \ldots, N-1\} \backslash w(v))$.

5. The information generation apparatus according to claim 4, wherein the random number generator further generates a random number $\sigma_{uj} \in Z_q$, corresponding to each element $j \in w(u)$ of the set $w(u)$;
   the information generation apparatus further comprising:
   a derivation information deriving unit, implemented by the processor, adapted to use the derivation information $k_{vj}$ read from the storage device and the generated random number $\sigma_{uj}$ to calculate derivation information $k_{uj}$ that satisfies $k_{uj} = \sigma_{uj} \Sigma_{i \in w(v) \backslash w(u)} u_i k_{vi} + k_{vj}$ for each element $j \in w$ (u) of the set $w(u)$.

6. An information generation apparatus comprising:
   a processor;
   a random number generator, implemented by the processor, adapted to generate a random number $r_Y \in Z_q$;

a first main information generator, implemented by the processor, adapted to use the generated random number $r_Y$ to calculate first main information $k_Y$ that satisfies $k_Y=g_2^a(g_3\Pi_{i\in\{1,\ldots,N-1\}\backslash w(Y)}h_i^{Y_i})^{r_Y}$;

a second main information generator, implemented by the processor, adapted to use the generated random number $r_Y$ to calculate second main information $g^{r_Y}$; and a derivation information generator, implemented by the processor, adapted to use the generated random number $r_Y$ to calculate derivation information $k_{Yj}$ that satisfies $k_{Yj}=h_j^{r_Y}$ for each element $j\in w(Y)$ of a set $w(Y)$;

where G and $G_T$ are cyclic groups having a prime number order q; g is a generator of the cyclic group G; the cyclic group G has a pairing function e: $G\times G\to G_T$, which makes $g_T=e(g, g)$ a generator of the cyclic group $G_T$; a is a random number selected at random from $Z_p$; and g, $g_1=g^a\in G$, and $g_2$, $g_3$, $h_1$, ..., $h_{N-1}\in G$ randomly selected from the cyclic group G are made publicly available as public keys; and

* indicates an indeterminate character; an index Y is $Y=(Y_1,\ldots,Y_{N-1})\in I=(F_q\cup\{*\})^{N-1}$; the set $w(Y)$ corresponds to the index Y; and $w(Y)=\{i|Y_i=*\}$.

7. The information generation apparatus according to claim 6, wherein the random number generator further generates a random number $r_u\in Z_q$, the information generation apparatus comprising:

a storage device adapted to store first main information $k_v$ corresponding to an index v, second main information $g^r$, and derivation information $k_{vj}$ corresponding to the index v;

a first main information deriving unit, implemented by the processor, adapted to use the first main information $k_v$ and derivation information $k_{vi}$, both of which are read from the storage device, to calculate first main information corresponding to an index u, which satisfies $k_u=k_v(\Pi_{i\in w(v)\backslash w(u)}k_{vi}^{u_i})(g_3\Pi_{i\in\{1,\ldots,N-1\}\backslash w(v)}h_i^{v_i}\Pi_{i\in w(v)\backslash w(u)}h_i^{u_i})^{r_u}$; and a second main information deriving unit, implemented by the processor, adapted to use the generated random number $r_u$ to calculate second main information $g^{r_u}$;

where * indicates an indeterminate character; the index v is $v=(v_1,\ldots,v_{N-1})\in I=(F_q\cup\{*\})^{N-1}$; $w(v)$ is a set corresponding to the index v and $w(v)=\{i|v_i=*\}$; the index u is $u=(u_1,\ldots,u_{N-1})\in I=(F_q\cup\{*\})^{N-1}$; and $w(u)$ is a set corresponding to the index u and $w(u)=\{i|u_i=*\}$; $w(u)\subset w(v)$; and $v_i=u_i$ ($i\in\{1,\ldots,-1\}\backslash w(v)$).

8. The information generation apparatus according to claim 7, further comprising a derivation information deriving unit, implemented by the processor, adapted to use the derivation information $k_{vi}$ read from the storage device and the generated random number $r_u$ to calculate derivation information $k_{uj}$ that satisfies $k_{uj}=k_{vj}h_j^{r_u}$ for element $j\in w(u)$ of the set $w(u)$.

9. An information generation apparatus comprising:

a processor;

a random number generator, implemented by the processor, adapted to generate a random number $r_u\in Z_q$;

a storage device adapted to store main information $k_v$ serving as main information $K_Y$ or corresponding to an index v, derived from first main information $k_Y$ and derivation information $k_{Yj}$, and derivation information $k_{vj}$ serving as derivation information $k_{Yj}$ or corresponding to the index v, derived from the derivation information $k_{Yj}$;

a first main information deriving unit, implemented by the processor, adapted to use the first main information $k_v$ and derivation information $k_{vi}$, both of which are read from the storage device, to calculate first main information $k_u$ corresponding to an index u, which satisfies $k_u=k_v(\Pi_{i\in w(v)\backslash w(u)}k_{vi}^{u_i})(g_3\Pi_{i\in\{1,\ldots,N-1\}\backslash w(v)}h_i^{v_i}\Pi_{i\in w(v)\backslash w(u)}h_i^{u_i})^{r_u}$; and a second main information deriving unit, implemented by the processor, adapted to use the generated random number $r_u$ to calculate second main information $g^{r_u}$;

where G and $G_T$ are cyclic groups having a prime number order q; g is a generator of the cyclic group G; the cyclic group G has a pairing function e: $G\times G\to G_T$, which makes $g_T=e(g, g)$ a generator of the cyclic group $G_T$; a is a random number selected at random from $Z_p$; and g, $g_1=g^a\in G$, and $g_2$, $g_3$, $h_1$, ..., $h_{N-1}\in G$ randomly selected from the cyclic group G are made publicly available as public keys;

* indicates an indeterminate character; an index Y is $Y=(Y_1,\ldots,Y_{N-1})\in I=(F_q\cup\{*\})^{N-1}$; and a set $w(Y)$ corresponding to the index Y is $w(Y)=\{i|Y_i=*\}$;

$r_Y\in Z_q$ is a random number; the first main information $k_Y$ corresponds to the index Y and satisfies $k_Y=g_2^a(g_3\Pi_{i\in\{1,\ldots,N-1\}\backslash w(Y)}h_i^{Y_i})^{r_Y}$; $g^{r_Y}$ is second main information corresponding to the index Y; and the derivation information $k_{Yj}$ corresponds to the index Y and satisfies $k_{Yj}=h_j^{r_Y}$; and

* indicates an indeterminate character; the index v is $v=(v_1,\ldots,v_{N-1})\in I=(F_q\cup\{*\})^{N-1}$; $w(v)$ is a set corresponding to the index v and $w(v)=\{i|v_i=*\}$; the index u is $u=(u_1,\ldots,u_{N-1})\in=I(F_q\cup\{*\})^{N-1}$; $w(u)$ is a set corresponding to the index u and $w(u)=\{i|u_i=*\}$; set $w(u)\subset$ set $w(v)$; and $v_i=u_i (i\in\{1,\ldots,N-1\}\backslash w(v))$.

10. The information generation apparatus according to claim 9, further comprising a derivation information deriving unit, implemented by the processor, adapted to use the derivation information $k_{vi}$ read from the storage device and the generated random number $r_u$ to calculate derivation information $k_{uj}$ that satisfies $k_{uj}=k_{vj}h_j^{r_u}$ for element $j\in w(u)$ of the set $w(u)$.

11. An information generation method, implemented by an information generation apparatus having a processor, comprising:

generating, in a random number generator, a random number $\sigma_Y\in Z_q$ and a random number $\sigma_{Yj}\in Z_q$ corresponding to each element $j\in w(Y)$ of a set $w(Y)$;

using, in a main information generator, the generated random number $\sigma_Y$ to calculate main information $k_Y$ that satisfies $k_Y=\sigma_Y\Sigma_{i\in\{1,\ldots,N-1\}\backslash w(Y)}Y_ib_i^*+b_N^*$; and using, in a derivation information generator, the generated random number $\sigma_{Yj}$ to calculate derivation information $k_{Yj}$ that satisfies $k_{Yj}=\sigma_{Yj}\Sigma_{i\in\{1,\ldots,N-1\}\backslash w(Y)}Y_ib_i^*+b_j^*$ for each element $j\in w(Y)$ of the set $w(Y)$;

where e is a non-degenerate, bilinear function that outputs one element of a cyclic group $G_T$ in response to inputs of N elements $\gamma_L$ (L=1, ..., N) (N≥2) of a cyclic group $G_1$ and N elements $\gamma_L^*$ (L=1, ..., N) of a cyclic group $G_2$; $b_i\in G_1^N$ (i=1, ..., N) is an N-dimensional basis vector having N elements of the cyclic group $G_1$ as elements; $b_j^*\in G_2^N$ (j=1, ..., N) is an N-dimensional basis vector having N elements of the cyclic group $G_2$ as elements; a function value obtained when each element of the basis vector $b_i\in G_1^N$ (i=1, ..., N) and each element of the basis vector $b_j^*\in G_2^N$ (j=1, ..., N) are put into the bilinear function e is represented by $g_T^{\tau\cdot\delta(i,j)}\in G_T$, using a Kronecker's delta function in which $\delta(i,j)=1_F$ when i=j and $\delta(i,j)=0_F$ when i≠j; $0_F$ is an additive unit element of a finite field $F_q$; $1_F$ is a multiplicative unit element of the finite field $F_q$; $\tau$ is an element of the finite field $F_q$, other than $0_F$; and $g_T$ is a generator of the cyclic group $G_T$; and

* indicates an indeterminate character, an index Y is $Y=(Y_1, \ldots, Y_{N-1}) \in I=(F_q \cup \{*\})^{N-1}$, and the set $w(Y)$ corresponds to the index Y and $w(Y)=\{i | Y_i=*\}$.

12. An information generation method, implemented by an information generation apparatus having a processor, comprising:

generating, in a random number generator, a random number $r_Y \in Z_q$;

using, in a first main information generator, the generated random number $r_Y$ to calculate first main information $k_Y$ that satisfies $k_Y = g_2^a (g_3 \Pi_{i \in \{1, \ldots, N-1\} \backslash w(Y)} h_i^{Y_i})^{r_Y}$;

using, in a second main information generator, the generated random number $r_Y$ to calculate second main information $g^{r_Y}$; and using, in a derivation information generator, the generated random number $r_Y$ to calculate derivation information $k_{Yj}$ that satisfies $k_{Yj}=h_j^{r_Y}$ for each element $j \in w(Y)$ of a set $w(Y)$;

where G and $G_T$ are cyclic groups having a prime number order q; g is a generator of the cyclic group G; the cyclic group G has a pairing function e: $G \times G \rightarrow G_T$, which makes $g_T = e(g, g)$ a generator of the cyclic group $G_T$; a is a random number selected at random from $Z_p$; and g, $g_1 = g^a \in G$, and $g_2, g_3, h_1, \ldots, h_{N-1} \in G$ randomly selected from the cyclic group G are made publicly available as public keys; and

* indicates an indeterminate character; an index Y is $Y=(Y_1, \ldots, Y_{N-1}) \in I=(F_q \cup \{*\})^{N-1}$; and the set $w(Y)$ corresponds to the index Y and $w(Y)=\{i | Y_i=*\}$.

13. A non-transitory computer-readable recording medium having stored thereon an information generation program that causes a computer to function as each unit of the information generation apparatus according to any one of claims 1 to 10.

* * * * *